(12) United States Patent
Raman et al.

(10) Patent No.: US 9,749,289 B2
(45) Date of Patent: Aug. 29, 2017

(54) INFRASTRUCTURE COORDINATED MEDIA ACCESS CONTROL ADDRESS ASSIGNMENT

(71) Applicant: Aruba Networks, Inc., Sunnyvale, CA (US)

(72) Inventors: Gopalakrishna Raman, Santa Clara, CA (US); Sachin Ganu, San Jose, CA (US); Daniel Harkins, La Selva Beach, CA (US); Mohd Siraj, San Jose, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 50 days.

(21) Appl. No.: 14/792,392

(22) Filed: Jul. 6, 2015

(65) Prior Publication Data
US 2017/0013449 A1  Jan. 12, 2017

Related U.S. Application Data

(63) Continuation of application No. 14/792,313, filed on Jul. 6, 2015.

(51) Int. Cl.
| | | |
|---|---|---|
| H04L 12/28 | (2006.01) | |
| H04L 29/12 | (2006.01) | |
| H04W 12/06 | (2009.01) | |
| H04W 8/26 | (2009.01) | |
| H04L 29/06 | (2006.01) | |
| H04W 8/00 | (2009.01) | |
| H04W 64/00 | (2009.01) | |

(Continued)

(52) U.S. Cl.
CPC .... *H04L 61/2061* (2013.01); *G06F 17/30864* (2013.01); *H04L 61/2038* (2013.01); *H04L 61/6022* (2013.01); *H04L 63/08* (2013.01); *H04L 63/1458* (2013.01); *H04W 8/005* (2013.01); *H04W 8/26* (2013.01); *H04W 12/06* (2013.01); *H04W 48/16* (2013.01); *H04W 64/006* (2013.01); *H04L 61/2092* (2013.01); *H04W 84/12* (2013.01)

(58) Field of Classification Search
CPC .................................................. H04L 51/2061
USPC ........................................................ 370/329
See application file for complete search history.

(56) References Cited

U.S. PATENT DOCUMENTS

| | | | | |
|---|---|---|---|---|
| 7,689,210 B1 * | 3/2010 | Bims | ...................... | H04B 7/022 370/338 |
| 8,027,637 B1 * | 9/2011 | Bims | ...................... | H04B 7/022 455/16 |
| 8,571,961 B1 | 10/2013 | Dvorak et al. | | |

OTHER PUBLICATIONS

"IEEE 802.1X"; retrieved on Nov. 21, 2016 from https://en.wikipedia.org/wiki/IEEE_802.1X; 8 pages.

* cited by examiner

*Primary Examiner* — Dang Ton
(74) *Attorney, Agent, or Firm* — Hewlett Packard Enterprise Patent Department

(57) ABSTRACT

Described herein are systems, devices, techniques and products for managing the dynamic assignment of media access control (MAC) addresses to wireless network devices, such as by identifying a dynamically assigned MAC address before, after, or during a wireless association process and communicating the dynamically assigned MAC address to a wireless network device. Also disclosed are systems, devices, techniques and products for preventing a denial of service attack on a wireless access point's association table, such as by requiring devices that associate with a wireless access point to respond to a query from the wireless access point shortly after association.

19 Claims, 13 Drawing Sheets

(51) Int. Cl.
*G06F 17/30* (2006.01)
*H04W 48/16* (2009.01)
*H04W 84/12* (2009.01)

INFRASTRUCTURE COORDINATED MEDIA ACCESS CONTROL ADDRESS ASSIGNMENT

CROSS REFERENCE TO RELATED APPLICATIONS

This application claims the benefit of and is a continuation of co-pending U.S. application Ser. No. 14/792,313 filed on Jul. 6, 2015, which is hereby expressly incorporated by reference in its entirety for all purposes.

FIELD

The present disclosure generally relates to technologies for managing computer networks. Specifically, various techniques and systems are provided for managing addressing of wireless clients connected to wireless networks.

BACKGROUND

A media access control (MAC) address is an identifier assigned to a network interface of a computing device to allow for low level (e.g., layer 2 or data link layer in the Open Systems Interconnection model) communications between devices on a shared network medium. Institute of Electrical and Electronics Engineers (IEEE) networking specifications, such as IEEE 802.3 (Ethernet) and IEEE 802.11 (Wi-Fi), define various aspects of the physical and data link layers, including media access control. Among other uses, MAC addresses are used in header information of network messages to facilitate transmission from a source device to a destination device. For example, layer 2 frames may include a source MAC address and a destination MAC address.

MAC addresses have been typically treated as unique identifiers. MAC addresses commonly use a 48-bit (6-byte) addressing scheme, though 64-bit addresses are also in use. The first 24 bits (3 bytes) of a 48-bit MAC address correspond to an Organizationally Unique Identifier (OUI) and the last 24 bits (3 bytes) are specific to the network interface. The seventh most significant bit in a MAC address identifies the MAC address as a universally administered address or a locally administered address. If this bit is 0, the address is a universally administered address; if this bit is 1, the address is a locally administered address. In the universally administered scheme, the first 3 bytes of a MAC address (OUI) corresponds to the device manufacturer and the last 3 bytes are uniquely assigned to individual network interface cards.

Every network interface card is typically assigned a universally administered MAC address with this address stored in hardware or firmware of the network interface card. As used herein, the phrases "true MAC address" and "hardware MAC address" are used to refer to the original MAC address of a network interface card that has been assigned by the manufacturer. MAC addresses assigned by the manufacturer are intended to be unique, e.g., the manufacturer is not supposed to assign the same MAC address to more than one device. A consequence of using the true MAC address in network communications is that, because this address does not change and is intended to be unique, devices can be uniquely and repeatedly identified by other network device based only on their true MAC address.

Mobile device manufacturers have begun masking MAC addresses of wireless network interfaces at the operating system level for a variety of reasons and using a variety of techniques. For example, prior to association with any wireless access points certain mobile devices can use a random MAC address generated by the mobile device for transmitted probe requests. Probe requests are used for scanning for available wireless access points, and may be considered a one-time use type message for which a random MAC address would be suitable. In this way, the probe requests may not uniquely identify the device and thus the device's identity may be masked, at least in part. It is possible, however, for a random MAC address to be identical to a MAC address used by another device, which may result in network problems. Network problems or problems with certain network or other functionality also can result if a mobile device changes its MAC address during an association session or uses different MAC addresses for different association sessions with the network. MAC addresses that are not true MAC addresses and are generated by a client device may be referred to herein as a "generated" MAC address or a "client generated" MAC address.

SUMMARY

Described herein are systems, devices, techniques, and products for associating wireless client devices with network devices, such as access points, using an infrastructure assigned media access control (MAC) address. Infrastructure assigned MAC addresses may also be referred to herein as "designated" MAC addresses or "network designated" MAC addresses. Designated MAC addresses are identified by a network infrastructure device for a particular wireless client device to use before, during, or after an association process so that the wireless client device can associate with a network using the designated MAC address.

Also disclosed are systems, devices, techniques, and products for associating wireless client devices with network devices, such as access points, in a way that limits the ability of wireless client devices to repeatedly associate with the network device using different MAC addresses and create excessive association table entries.

In an aspect, methods are provided, such as computer implemented methods. Computer implemented methods of this aspect may be implemented on a network device, such as a network device, network controller, access point, and the like. Computer implemented methods of this aspect may also be implemented on wireless client devices, such as laptop computers, tablet computers, smartphones, printers, and the like. In various embodiments, devices for performing methods of this aspect may include network hardware, such as wired and wireless network transceivers, power supplies, batteries, antennas, physical network ports, etc., and may be configured to wirelessly communicate with other devices even if the devices are not associated with a common wireless network.

Methods of this aspect are optionally performed by network devices, such as wireless access points, network controllers, network management devices, services or appliances, etc. In various embodiments, a designated MAC address used by a wireless client is determined by a network infrastructure device during the association process. In a specific embodiment, a method of this aspect comprises receiving, at a network device, a frame from a wireless client device that includes a MAC address being used by the wireless client device, such as a true or generated MAC address; transmitting a response, such as, but not limited to, an association response that includes an association identifier for the wireless client device; identifying a designated MAC address for use by the wireless client device; transmitting the designated MAC address; facilitating disassociation with the wireless client device; receiving a new request, such as, but not limited to, a new association request from the wireless client device that includes the designated MAC address; transmitting a new response, such as, but not limited to, a new association response that includes a new association identifier for the wireless client device; and updating an association table with an entry for the wireless client device, such as an entry that includes the designated MAC address. Optionally, the network device is a wireless access point compliant with an IEEE 802.11 standard.

In embodiments, a frame received from a wireless client device may be a request, such as an explicit request for a designated MAC address. In other embodiments, a frame received from a wireless client device may not correspond to a request at all; that is, it may not be a query for information or a response, but may instead simply be another type of frame. For example, a frame received from a wireless client device may be other than a request for a designated MAC address, such as a wireless management frame, for example an authentication frame, an association request, etc., a class 1 frame, or a data frame. Optionally, a frame received from a wireless client device that is not using a designated MAC address, such as a designated MAC address that may optionally be provided by the network device, may be treated as if the frame included a request for a designated MAC address. In this way, network devices implementing aspects described herein can receive frames from a wireless client device and then transmit a response including a designated MAC address to be used thereafter by the wireless client device, without specific configuration or operational changes to the wireless client devices for requesting the designated MAC address. Upon receiving a designated MAC address, a wireless client device may advantageously adopt and use this designated MAC address for subsequent communications with the network device.

In embodiments, methods of this aspect include causing a disassociation between a network device, such as an access point, and a wireless client device and then causing a reassociation using an infrastructure designated MAC address. Optionally, the disassociation is caused because the wireless client device is not using an infrastructure designated MAC address. For example, in some embodiments, facilitating disassociation includes transmitting or receiving a disassociation message. The skilled artisan will appreciate that disassociation may be caused by the wireless client device or the network device. Accordingly, facilitating disassociation optionally includes transmitting a disassociation frame or a deauthentication frame. Alternatively, facilitating disassociation optionally includes receiving a disassociation frame or a deauthentication frame. Optionally, facilitating disassociation causes the wireless client device to transmit a new request or frame including the designated MAC address.

Optionally, methods of this aspect do not require a disassociation to occur between a network device, such as an access point, and a wireless device. For example in one embodiment, a method of this aspect comprises receiving, at a network device, a request, such as, but not limited to, an authentication request that is related to a wireless client device and that includes a MAC address corresponding to the wireless client device; identifying a designated MAC address for use by the wireless client device; transmitting a response, such as, but not limited to, an authentication response that includes the designated MAC address; receiving a new request, such as, but not limited to, an association request that is related to the wireless client device and that includes the designated MAC address; transmitting a new response, such as, but not limited to, an association response that includes an association identifier for the wireless client device; and updating an association table with an entry for the wireless client device, such as an entry that includes the designated MAC address. In embodiments, the network device is a wireless access point compliant with an IEEE 802.11 standard.

In embodiments, a designated MAC address is a MAC address that is selected by a wireless network infrastructure device or related controller or network management device or service for use by a wireless client device instead of a wireless client device's true or generated MAC address. For some embodiments, a designated MAC address corresponds to a locally administered address selected by the network infrastructure for use by a wireless client device, and may optionally be randomly or systematically selected. As described above, the first 24 bits (3 bytes) of a 48-bit MAC address correspond to an Organizationally Unique Identifier (OUI) and the last 24 bits (3 bytes) are specific to the network interface. The seventh most significant bit in a MAC address identifies the MAC address as a universally administered address or a locally administered address. If this bit 0, the address is a universally administered address; if this bit is 1, the address is a locally administered address. In the universally administered scheme, the first 3 bytes of a MAC address (OUI) corresponds to the device manufacturer and the last 3 bytes are uniquely assigned to individual network interface cards. Use of locally administered MAC addresses (in which the seventh most significant bit is 1) for designated MAC address provides a benefit in that a designated MAC address generally cannot be the same as a true MAC address used by a wireless client device, as true MAC addresses generally correspond to universally administered addresses (in which the seventh most significant bit is 0), so there will be, at minimum, a one bit difference between a designated MAC address and the closest true MAC address. Optionally, a designated MAC address corresponds to a locally administered MAC address. In embodiments, designated MAC addresses correspond to random MAC addresses that are locally administered. Use of locally administered MAC addresses may provide advantages in limiting confusion of the designated MAC address as corresponding to a specific hardware vendor. Use of locally administered MAC addresses may also provide advantages in preventing two wireless client devices from using the same MAC address, such as a situation where one wireless client device uses its true MAC address and where another wireless client device uses a designated MAC address that is selected at random.

Other techniques for preventing multiple devices from using the same MAC address may be implemented. For example, designated MAC addresses may be identified in which certain bits are unlikely to be used or are not used by a wireless client device, such MAC addresses including an OUI corresponding to an obsolete or defunct manufacturer or including an OUI that is unassigned.

Alternatively or additionally, a list of MAC addresses that have been observed and/or identified, including identified or assigned designated MAC addresses, may be maintained. Optionally, designated MAC addresses not on the list may be identified for new wireless client devices. In this way, new wireless client devices can be assigned designated MAC addresses that are not already in use by another wireless client device.

Alternatively or additionally, the same designated MAC address may be identified for a wireless client device each time the wireless client device associates with a network or one or more network devices connected to the network, such as when the wireless client device roams or re-associates with the network after some disassociation period. In this way, the same designated MAC address can be re-assigned for use by the wireless client device. Optionally, device characteristics or authentication characteristics can be used for tracking the wireless client device, as will be described in more detail below, to facilitate reidentification of a MAC address previously designated for use by the wireless client device.

Various techniques are useful for identifying the designated MAC address to be used by the wireless client device. For example, in one embodiment, identifying includes selecting the designated MAC address from a pool of predetermined MAC addresses available to the network device for use by client devices. Optionally, identifying includes selecting the designated MAC address from a pool of random MAC addresses available to the network device for use by client devices. Optionally, a designated MAC address is identified by the network device. Optionally, a pool of predetermined, random, or designated MAC addresses is assigned to the network device for identification for and assignment to wireless client devices. In this way, a network device may receive a block or list of designated MAC addresses and use addresses from the block or list for identification of designated MAC addresses to be used by wireless client device.

In some embodiments, a designated MAC address is identified by another network device, such as a network controller, a network management device, service or appliance, etc. Optionally, the designated MAC address is identified by a device designated to manage network access. For example, in one embodiment, identifying includes transmitting a designated MAC address request, such as to another network device, and receiving the designated MAC address in response. For example, receiving the designated MAC address request at some other network device causes the other network device to transmit a designated MAC address response including the designated MAC address. In this way, a network device can advantageously query another network device for a designated MAC address for use by a wireless client device and need not necessarily manage designated MAC address assignments itself. For example, querying another network device for a designated MAC address for use by a wireless client device can occur in response to an association attempt by the wireless client device or in response to a MAC address request received from the wireless client device.

The designated MAC address may be communicated to the wireless client devices using a variety of data exchanges. For example, in one embodiment, the association response includes transmitting the designated MAC address. Optionally, facilitating disassociation includes transmitting the designated MAC address. Optionally, a data message is transmitted by the network device that includes the designated MAC address.

In various embodiments, a MAC address included in an initial association request is not a true or hardware MAC address of a wireless client device but is instead a generated MAC address, which may correspond to a random MAC address or a locally administered MAC address. For example, in one embodiment, identifying a designated MAC address includes identifying the MAC address included in the association request as different from a hardware MAC address corresponding to the wireless client device. Optionally, identifying a designated MAC address includes identifying the MAC address included in the association request as a generated MAC address. Optionally, identifying a designated MAC address includes identifying the MAC address included in the association request as a randomly assigned MAC address. Optionally, identifying a designated MAC address includes identifying the MAC address included in the association request as a locally administered MAC address. In some embodiments, after identifying the MAC address included in the request as a locally administered MAC address, the network device transmits a designated MAC address.

Characteristics of a wireless client device may be useful for tracking the wireless client device. For example, useful characteristics include, but are not limited to a true or hardware MAC address of the wireless client device, a tracking cookie present on the wireless client device, a device identifier corresponding to the wireless client device, a device profile corresponding to the wireless client device, authentication credentials corresponding to a user of the wireless client device, software credentials corresponding to a software component present on the wireless client device, a token corresponding to the wireless client device, a token corresponding to a user of the wireless client device, a wireless signature characterizing the wireless transmission/reception of the wireless client device, a software profile of the wireless client device, a hardware profile of the wireless client device, and the like. Optionally, a method of this aspect further comprises determining a characteristic of the wireless client device; and tracking the wireless client device using the characteristic.

Wireless client device characteristics may be determined through one or more data exchanges between a network device and a wireless client device. For example, a wireless client device characteristic may be transmitted by the wireless client device, such as during a network discovery or announcement process or through use of one or more network technologies, such as Universal Plug and Play, Zero-configuration networking, Bonjour, etc. Characteristics may also include wireless client device profiles or fingerprints that may identify the wireless client device and may be determined by a network device by analysis of domain name server requests, hardware characteristics, software characteristics, network characteristics, wireless broadcast characteristics, etc., to allow repeated identification of a wireless client device on the network infrastructure side.

Optionally, tracking includes determining a location of the wireless client device, such as a physical location or a geographic location. Optionally, the location of the wireless client device is stored and/or analyzed. Optionally, the location of the wireless client device is linked and/or correlated with a device identifier. Various location determination methods may be incorporated into the methods described herein, including wireless triangulation methods, proximity determination methods, distance determination methods, direction determination methods, location determination methods including beamforming techniques, etc. Optionally, the location of the wireless client device is used for identification of a client device as a client device that has previously associated with or attempted association with a network device.

In embodiments, a designated MAC address may be identified for use by a specific wireless client device and may be repeatedly assigned to the specific wireless client device upon later associations with the network device or with other network devices within the same network. Optionally, a designated MAC address is reassigned to the specific wireless client as it roams to neighboring network devices connected to the same network. Optionally, tracking includes linking the designated MAC address to the wireless client device, such as through one or more database or table entries. Optionally, linking facilitates reidentification of the designated MAC address for later use by the wireless client device. For example, an embodiment of this aspect may further comprise determining a characteristic of the wireless client device and linking the designated MAC address with the characteristic of the wireless client device, such as to facilitate identification of the designated MAC address for use by the wireless client device when the wireless client device associates with another network device. Optionally, identifying the designated MAC address includes determining a characteristic of the wireless client device. Optionally, identifying the designated MAC address includes using the characteristic of the wireless client device.

In various embodiments, a network device, such as an access point, may advertise network services, such as the ability to provide a designated MAC address to a wireless client device. In this way, a network device may inform wireless client devices that the network device can provide a designated MAC address or requires the use of true or designated MAC addresses for associating devices. Optionally, a method of this aspect further comprises transmitting an indicator of an availability of designated MAC addresses. For example, receiving the indicator at a wireless client device facilitates the wireless client device transmitting a request for a designated MAC address. Optionally, receiving the indicator at a wireless client device causes the wireless client device to transmit a request for a designated MAC address.

As used herein, the term indicator corresponds to a detectable signal providing a notification. In embodiments, an indicator may correspond to a flag or bit in a data message. Optionally, an indicator may correspond to a recognizable, agreed upon, or standardized sequence included in a frame or other message transmitted by a network device. Optionally, transmitting the indicator includes transmitting a beacon frame or a probe response frame including the indicator. Optionally, a service set identifier (SSID) of the beacon frame or probe response frame includes the indicator. Optionally, a vendor specific element of the beacon frame or probe response frame includes the indicator. Other embodiments are possible.

Optionally, in some embodiments, a network device may not broadcast the availability of designated MAC address but still may require use of designated MAC addresses and/or true MAC addresses by wireless client devices that associate or attempt to associate with the network device. In one embodiment, a network device may refuse association or otherwise fail to associate with a wireless client device unless the wireless client device transmits an association request including a designated MAC address that has been provided by the network infrastructure.

In some embodiments, upon a wireless client device initially associating using a MAC address that is not a designated MAC address or is not a true MAC address, permission may be requested for use of designated MAC addresses, such as by using an opt-in or opt-out method. For example, in one embodiment, a method of this aspect further comprises transmitting a captive portal website that requests input authorizing use of a designated MAC address; and receiving input corresponding to an authorization to use the designated MAC address.

Embodiments described herein are useful for limiting the creation of entries in an association table that are not used or may otherwise create difficulties for associating additional wireless client devices with a network device, such as an access point. In one embodiment, a method of this aspect further comprises transmitting an association query, such as an association query that includes the designated MAC address; monitoring for a response to the association query for a predetermined time period; determining that no response to the association query is received during the predetermined time period; and updating the association table to remove the entry for the wireless client device. Optionally, receiving the association query at the wireless client device causes the wireless client device to transmit a response to the association query.

In various embodiments, designated MAC addresses are identified for use by a single wireless client device. In some embodiments, failure to associate using a designated MAC address within a specified time period results in the designated MAC address automatically being released or otherwise designated as unreserved and, thus, available for use by another wireless client device. In one embodiment, a method of this aspect further comprises monitoring for an association request including the designated MAC address for a predetermined time period; determining that no association request including the designated MAC address is received during the predetermined time period; and identifying the designated MAC address as available for use by another wireless client device. In one embodiment, identification of a designated MAC address as available or unavailable includes modification of an entry in a database or table.

Optionally, additional authentication processes are required for network access after association. For example, embodiments of this aspect optionally further comprise facilitating authentication of the wireless client device after transmitting the new association response. Alternatively or additionally, embodiments of this aspect further comprise determining that the wireless client device has not successfully authenticated within a predetermined time period after transmitting the new association response; and updating the association table to remove the entry for the wireless client device. Alternatively or additionally, embodiments of this aspect further comprise transmitting an authentication query; monitoring for an authentication response to the authentication query for a predetermined time period; determining that no authentication response is received during the predetermined time period; and updating the association table to remove the entry for the wireless client device. Optionally, receiving the authentication at the wireless client device causes the wireless client device to transmit a response to the authentication query. In a specific embodiment, the authentication query and the response to the authentication query include elements of an IEEE 802.1X authentication process. In a specific embodiment, the authentication query and the response to the authentication query include elements of an IEEE 802.11i authentication process.

Methods of this aspect are optionally performed by wireless client devices. For example, in a specific embodiment, a method of this aspect comprises transmitting, by a wireless client device, a frame, such as an association request, that includes a media access control (MAC) address corresponding to the wireless client device; receiving an association response, such as an association response that is related to a network device and that includes an association identifier; receiving a designated MAC address; disassociating from the network device; transmitting a new association request to the network device, such as a new association request that includes the designated MAC address; and receiving a new association response, such as a new association response that is related to the network device and that includes a new association identifier.

In various embodiments, a wireless client device may include software features, specialized applications, or operating system features that allow for the use of and/or recognize designated MAC addresses and employ them as described herein. Optionally, security settings on a network may activate software features, specialized applications, or operating system features on the client device that employ the methods described herein for using designated MAC addresses. For example, in one embodiment, a software process, such as an operating system or an application on the wireless client device, may generate a request for a designated MAC address or may generate an association request or other query that results in identification of a designated MAC address for use by the wireless client device. Optionally, such a software process may be installed by a device manufacturer or may be part of an operating system installed on the wireless client device. Optionally, such a software process may be downloaded and/or installed by a user and available through an application store or other software database. Optionally, such a software process may be downloaded and/or installed by an administrator as part of a device, user, or security enrollment process. In some embodiments, such a software process may be incorporated into a network log-on, authentication, or connection routine, such as a process for connection to a virtual private network (VPN). In one embodiment, an operating system or application software feature for requesting a designated MAC address may be activated upon installation of a security certificate and/or network profile, such as may be installed and/or downloaded by an administrator as part of a device, user, or security enrollment process. In such a configuration, upon installation of the security certificate and/or network profile, a software feature on a wireless client device may begin requesting designated MAC addresses, such as upon associating or detecting a wireless network, such as a wireless network that makes use of designated MAC addresses.

As described previously, disassociation may be initiated by the network infrastructure or the wireless client device. In one embodiment, facilitating disassociation includes transmitting or receiving a disassociation message. Optionally, facilitating disassociation includes transmitting or receiving a disassociation frame or a deauthentication frame. Optionally, facilitating disassociation includes receiving the designated MAC address.

In embodiments, a network device receiving a request identifies the designated MAC address for use by the wireless client device. In one embodiment, for example, receiving the request at the network device causes the network device to identify the designated MAC address. Optionally, the request includes an identifier corresponding to the network device. Optionally, identification of the designated MAC address includes using the identifier corresponding to the network device.

Upon receiving the designated MAC address, in embodiments, the wireless client device connects with the wireless network using the designated MAC address. Optionally, the network device that is associating with the wireless client device may verify the designated MAC address used by the wireless client device. For example, receiving an association request at the network device causes the network device to confirm that the designated MAC address included in the association request is authorized for use by the wireless client device. Optionally, receiving an association request at the network device causes the network device to update an association table with an entry for the wireless client device, such as an entry that includes the designated MAC address.

Optionally, methods of this aspect do not require a disassociation to occur between a network device, such as an access point, and a wireless device. For example in one embodiment, a method of this aspect comprises transmitting, by a wireless client device, a request, such as, but not limited to, an authentication request that includes a media access control (MAC) address corresponding to the wireless client device; receiving a response, such as, but not limited to, an authentication response that is related to a network device and that includes a designated MAC address; transmitting a new request, such as, but not limited to, an association request that includes the designated MAC address; and receiving a new response, such as, but not limited to an association response that is related to the network device and that includes an association identifier.

Optionally, the wireless client device may determine that the wireless network is offering or requiring the use of designated MAC addresses. For example, in one embodiment, a method of this aspect further comprises receiving an indicator of an availability of designated MAC addresses. Optionally, methods of this aspect further comprise transmitting a request for a designated MAC address. For example, in embodiments, receiving the request for a designated MAC address at a network device causes the network device to identify a designated MAC address. Optionally, receiving the indicator includes receiving a beacon frame or a probe response frame. Optionally, the beacon frame or probe response frame includes the indicator. Optionally, a service set identifier (SSID) of the beacon frame or probe response frame includes the indicator. Optionally, a vendor specific element of the beacon frame or probe response frame includes the indicator.

In specific embodiments, an opt-in or opt-out process may be used for providing the ability to associate with a wireless network using a designated MAC address. For example, in one embodiment, a method of this aspect further comprises displaying a captive portal website, wherein the captive portal website requests input authorizing use of a designated MAC address; receiving input corresponding to an authorization to use the designated MAC address; and transmitting the authorization.

Methods of this aspect may further require an associated device to exchange additional data with the network device shortly after association in order to maintain or create an association table entry on the network device. Use of such techniques may advantageously minimize the risk of the association table filling up with erroneous or unused entries, such as entries corresponding to wireless client devices that have disconnected from the network device but that did not communicate this to the network device. As will be understood by the skilled artisan, an association table on a network device, such as a wireless access point, has a finite size, such as a size of 256 entries. If 256 entries are present in the association table, additional wireless client devices may not be able to associate with the network device. In one embodiment, a method of this aspect further comprises receiving a query, such as an association query, that includes the designated MAC address; and transmitting a response to the association query.

Optionally, additional authentication after the association process completes will be required before a wireless client device can transmit data through the network. For example, in embodiments, a method of this aspect further comprises receiving an authentication query; and transmitting a response to the authentication query. Optionally, if authentication is not successfully completed, a network device may disassociate the unauthenticated wireless client device. For example, in embodiments, receiving the response to the authentication query at the network device causes the network device to update an association table with an entry for the wireless client device, such as an entry includes the designated MAC address. Optionally, the authentication query and the response to the authentication query include elements of an IEEE 802.1X authentication process. Optionally, the authentication query and the response to the authentication query include elements of an IEEE 802.11i authentication process.

As described above, methods of this aspect are optionally performed by network devices, such as wireless access points, network controllers, network management devices or services or appliances, etc. In various embodiments, a designated MAC address to be used by a wireless client is determined before a wireless client device associates with the network device. For example, a specific method embodiment of this aspect comprises receiving, at a network device, a request for a media access control (MAC) address, such as a request that is related to a wireless client device; identifying a designated MAC address for use by the wireless client device; transmitting a response to the request that includes the designated MAC address; receiving an association request, such as an association request related to the wireless client device that includes the designated MAC address; transmitting an association response that includes an association identifier for the wireless client device; and updating an association table with an entry for the wireless client device that includes the designated MAC address. As described above, network devices may be compliant with a wireless network standard, such as an IEEE 802.11 standard, for example, an 802.11n standard, an 802.11ac standard, and later and future 802.11 standards.

In various embodiments, methods of identifying and communicating a designated MAC address may occur prior to association. As will be understood by the skilled artisan, data exchanges between non-associated devices are possible, such as those frames which are exchanged during initial probing or during the association process. In embodiments, the MAC address request includes a Class 1 management frame, an action frame, an authentication frame, or a probe request frame. In embodiments, the response includes a Class 1 management frame, an action frame, an authentication frame, or a probe response frame. Optionally, transmitting the response to the MAC address request includes transmitting the response to the MAC address request when an entry for the wireless client device is not present in the association table.

Use of designated MAC addresses is useful for allowing a network to manage the MAC addresses used by wireless client devices and to track various characteristics of the wireless client devices. Optionally, receiving the designated MAC address at a wireless client device causes the wireless client device to transmit an association request including the designated MAC address. In an embodiment, a method of this aspect further comprises confirming that the designated MAC address included in the association request is authorized for use by the wireless client device.

Various techniques are useful for identifying a designated MAC address. For example, in one embodiment, identifying includes selecting the designated MAC address from a pool of predetermined MAC addresses. Optionally, identifying includes selecting the designated MAC address from a pool of random MAC addresses. Optionally, identifying includes transmitting a designated MAC address request, such as to a network controller or other management device, service or appliance, and receiving the designated MAC address. Optionally, receiving the designated MAC address request at a controller causes the controller to transmit a designated MAC address response including the designated MAC address. Optionally, the controller utilizes a pool of random MAC addresses for the designated MAC addresses, such as a pool including locally administered MAC addresses. In this way, the designated addresses selected by the controller for a wireless client device can be tracked to ensure multiple wireless client devices are not assigned the same designated MAC address or to ensure that a designated MAC address is not the same as a true MAC address that may be in use by another wireless client device.

Optionally, use of a designated MAC address may be required when a MAC address used in the MAC address request is determined to be a generated MAC address or determined to not correspond to a hardware MAC address. For example, in one embodiment, receiving the MAC address request includes identifying a MAC address included in the MAC address request as different from a hardware MAC address corresponding to the wireless client device. Optionally, receiving the MAC address request includes identifying a MAC address included in the MAC address request as a client generated MAC address. Optionally, receiving the MAC address request includes identifying a MAC address included in the MAC address request as a randomly assigned MAC address. Optionally, receiving the MAC address request includes identifying a MAC address included in the MAC address request as a locally administered MAC address.

As described above, tracking of devices may be advantageous for a number of reasons, including simplifying roaming of wireless client devices between access points, to allow for location determination, to track behavior of the same device over time for diagnostic or network management purposes, or for reuse/reassignment of designated MAC addresses by/to the same wireless client device. For example, in an embodiment, a method of this aspect further comprises: determining a characteristic of the wireless client device; and tracking the wireless client device using the characteristic. Optionally, tracking includes determining a location of the wireless client device. Optionally, a designated MAC address is determined based on the location of the wireless device at the time the designated MAC address is requested and/or assigned. Optionally, tracking includes linking the designated MAC address to the wireless client device to facilitate reidentification of the designated MAC address for use by the wireless client device. Optionally, a method of this aspect further comprises determining a characteristic of the wireless client device; and linking the designated MAC address with the characteristic of the wireless client device to facilitate identification of the designated MAC address for use by the wireless client device when the wireless client device roams to another wireless network device. Optionally, identifying the designated MAC address includes determining a characteristic of the wireless client device and identifying the designated MAC address using the characteristic of the wireless client device.

As described above, the network infrastructure may advertise that it is providing or requiring designated MAC addresses. For example, in one embodiment, a method of this aspect further comprises transmitting an indicator of an availability of designated MAC addresses. Optionally, receiving the indicator at a wireless client device facilitates the wireless client device transmitting a request for a MAC address. Optionally, transmitting the indicator includes transmitting a beacon frame or a probe response frame, and wherein the beacon frame or probe response frame includes the indicator. In embodiments, a service set identifier (SSID) of the beacon frame or probe response frame includes the indicator. In embodiments, a vendor specific element of the beacon frame or probe response frame includes the indicator.

Methods of this aspect may use data exchanges to limit association table denial of service attacks in which, for example, a client device uses different client generated MAC addresses in separate association requests over a limited period of time. For example, in an embodiment, a method of this aspect further comprises transmitting an association query; monitoring for a response to the association query for a predetermined time period; determining that no response to the association query is received during the predetermined time period; and updating the association table to remove the entry for the wireless client device. Optionally, receiving the association query at a wireless client device causes the wireless client device to transmit a response to the association query.

When a wireless client device does not immediately associate using an identified designated MAC address, the designated MAC address may optionally be released for use by other wireless client devices. For example, in one embodiment, a method of this aspect further comprises monitoring for an association request including the designated MAC address for a predetermined time period; determining that no association request including the designated MAC address is received during the predetermined time period; and identifying the designated MAC address as available for use by another wireless client device.

Optionally, methods of this aspect may require additional authentication before network services are available at a wireless client device. In one embodiment, a method of this aspect further comprises facilitating authentication of the wireless client device after transmitting the association response. Additionally or alternatively, a method of this aspect further comprises determining that the wireless client device has not successfully authenticated within a predetermined time period after transmitting the association response; and updating the association table to remove the entry for the wireless client device. Additionally or alternatively, a method of this aspect comprises transmitting an authentication query, such as where receiving the authentication at the wireless client device causes the wireless client device to transmit a response to the authentication query; monitoring for an authentication response to the authentication query for a predetermined time period; determining that no authentication response is received during the predetermined time period; and updating the association table to remove the entry for the wireless client device. Optionally, the authentication query and the response to the authentication query include elements of an IEEE 802.1X authentication process. Optionally, the authentication query and the response to the authentication query include elements of an IEEE 802.11i authentication process.

Methods of this aspect are optionally performed by wireless client devices. In specific embodiments, wireless client devices are configured to request a designated MAC address prior to attempting association with a network device, such as an access point, for example an access point compliant with an IEEE 802.11 standard. In a specific embodiment, a method of this aspect comprises transmitting, by a wireless client device, a request for a media access control (MAC) address; receiving a response to the request, such as a response that is related to a network device and that includes a designated MAC address; transmitting an association request, such as an association request that includes the designated MAC address; and receiving an association response that is related to the network device and that includes an association identifier. In various embodiments, a wireless client device may include software features, specialized applications, or operating system features that make use of and/or recognize designated MAC addresses and employ them as described herein. Optionally, security settings on a network may activate software features, specialized applications, or operating system features that employ the methods described herein for using designated MAC addresses.

As the identification and communication of the designated MAC address may occur prior to association, pre-association data exchanges may be required. For example, in one embodiment, the MAC address request includes a Class 1 management frame, an action frame, an authentication frame, or a probe request frame. In one embodiment, the response to the MAC address request includes a Class 1 management frame, an action frame, an authentication frame, or a probe response frame.

In embodiments, the designated MAC address is identified by the network device. Optionally, receiving the request at the network device causes the network device to identify the designated MAC address. Optionally, the request for a MAC address includes an identifier corresponding to the network device, such as a BSSID or network device MAC address. Optionally, receiving the association request at the network device causes the network device to confirm that the designated MAC address included in the association request is authorized for use by the wireless client device. Optionally, receiving the association request at the network device causes the network device to update an association table with an entry for the wireless client device, and wherein the entry includes the designated MAC address.

In embodiments where a network device advertises that it is providing or requiring the use of designated MAC addresses, a wireless client device may be configured to detect such an advertisement and then request the designated MAC address prior to association. For example, in one embodiment, a method of this aspect further comprises receiving an indicator of an availability of designated MAC addresses. Optionally, receiving the indicator includes receiving a beacon frame or a probe response frame, and wherein the beacon frame or probe response frame includes the indicator. Optionally, a service set identifier (SSID) of the beacon frame or probe response frame includes the indicator. Optionally, a vendor specific element of the beacon frame or probe response frame includes the indicator.

In various embodiments, association table denial of service attacks are minimized by the network device by requiring additional data exchange with a wireless client device before an entry in the association table for the wireless client device is made or in order to maintain it. Optionally, a method of this aspect further comprises receiving an association query that includes the designated MAC address; and transmitting a response to the association query.

In various embodiments, additional authentication is required by a network device, such as authentication beyond that which takes place as part of an association process. For example, authentication may be required such as an IEEE 802.1X authentication. In one embodiment, a method of this aspect further comprises transmitting an authentication query; monitoring for an authentication response to the authentication query for a predetermined time period; determining that an authentication response is not received during the predetermined time period; and updating the association table to remove the entry for the wireless client device. Optionally, receiving the authentication at the wireless client device causes the wireless client device to transmit a response to the authentication query. Optionally, receiving the response to the authentication query at the network device causes the network device to update an association table with an entry for the wireless client device, and wherein the entry includes the designated MAC address. Optionally, the authentication query and the response to the authentication query include elements of an IEEE 802.1X authentication process or an IEEE 802.11i authentication process.

In embodiments, a network device may function to prevent or limit association table denial of service attacks. As described herein, an association table denial of service attack may occur when a malfunctioning or malicious device repeatedly associates with a network device, such as a wireless access point, using different MAC addresses. For each association, an entry in an association table may be created that identifies the MAC address. As will be understood by the skilled artisan, an association table on a network device has a finite size, such as a size of 256. If 256 entries are present in the association table, additional wireless client devices may not be able to associate with the network device. Association table entries may expire after a fixed amount of time, but it is possible for a malfunctioning or malicious device to fill up an association table in a shorter amount of time than the expiry time. Additionally, if a malfunctioning or malicious device is continuing to transmit repeated association requests with different MAC addresses, new entries will be created as old entries expire, and the problem will persist.

Therefore, network devices may require an associated device to exchange additional data with the network device shortly after association in order to maintain or create an association table entry. Alternatively or additionally, a network device may track characteristics of a client device that is transmitting multiple probe or association requests using different MAC addresses and may refuse or fail to acknowledge requests that are identified as being associated with that client device. In these ways, the risk of the association table filling up with erroneous or unused entries is minimized, as devices that exchange data with the network device and/or do not transmit repeated association requests can be considered to be properly associated and making use of the association table entry.

In a specific embodiment, a method of this aspect comprises receiving, at a network device, an association request, such as an association request that is related to a wireless client device; transmitting an association response, such as an association response that includes an association identifier for the wireless client device; updating an association table with an entry for the wireless client device; transmitting an association query; monitoring for a response to the association query for a predetermined time period after transmitting the association response; determining that a response to the association query is not received during the predetermined time period; and updating the association table to remove the entry for the wireless client device. Optionally, receiving the association query at a wireless client device causes the wireless client device to transmit a response to the association query. 22. Optionally, the network device is a wireless access point compliant with an IEEE 802.11 standard. Optionally, the network device is a network controller.

In another specific embodiment, a method of this aspect comprises receiving, at a network device, an association request, such as an association request that is related to a wireless client device; transmitting an association response, such as an association response that includes an association identifier for the wireless client device; transmitting an association query; monitoring for a response to the association query for a predetermined time period after transmitting the association response; and determining that a response to the association query is not received during the predetermined time period. Optionally, receiving the association query at a wireless client device causes the wireless client device to transmit a response to the association query.

In another specific embodiment, a method of this aspect comprises receiving, at a network device, an association request, such as an association request that is related to a wireless client device; transmitting an association response, such as an association response that includes an association identifier for the wireless client device; transmitting an association query; monitoring for a response to the association query for a predetermined time period after transmitting the association response; determining that a response to the association query is received during the predetermined time period; and updating an association table with an entry for the wireless client device. Optionally, receiving the association query at a wireless client device causes the wireless client device to transmit a response to the association query.

Various association queries are useful with methods of this aspect. In embodiments, useful association queries are data messages that require a response, such as a reply, acknowledgment or other message that is sent in response to an association query. For example, in one embodiment, the association query includes a null data packet. Optionally, the response to the association query includes an acknowledgement packet. Optionally, the association query includes a plurality of null data packets. Optionally, the response to the association query includes a plurality of acknowledgement packets. In another embodiment, the association query includes an Internet Control Message Protocol echo request message, also known as a ping message. Optionally, the response to the association query includes an Internet Control Message Protocol echo reply message, also known as a ping response. Optionally, the association query includes an identification request message, such as a request for an identifier. Optionally, the response to the association query includes a wireless client identifier. In another embodiment, the association query includes a dynamic host configuration protocol (DHCP) offer message. Optionally, the response to the association query includes a DHCP request message. Other embodiments are possible.

In some embodiments, the association query is a multi-component query. For example, the association query may include a series of sub-queries that are transmitted during a specified time period, such as starting at 10 ms after an initial probe message and/or probe response message and occurring every 5 ms for 5 separate sub-queries. In this way, a client device that may initially request or respond but that later stops responding before the end of the series of sub-queries can have its association table entry withheld or deleted. For example, in one embodiment, determining that a response to the association query is not received during the predetermined time period includes determining that only an incomplete response to the association query is received during the predetermined time period.

Optionally, authentication steps may also be utilized as the association query and response to the association query. For example, in one embodiment, the association query includes a request for authentication and the response to the association query includes an authentication credential. Optionally, determining that a response to the association query is not received during the predetermined time period includes determining that the wireless client device has not successfully authenticated.

In some embodiments, authentication may be a separate process beyond the association query and response. Optionally, if initial association completes but authentication does not complete successfully, an association table entry may be withheld or deleted and/or the client device may be de-associated. In one embodiment, a method of this aspect further comprises facilitating authentication of the wireless client device after transmitting new association response. Optionally, the association query and the response to the association query include elements of an IEEE 802.1X authentication process.

In various embodiments, messages exchanged between a network device and a wireless client device identify a MAC address, such as a source MAC address and a destination MAC address. The skilled artisan will appreciate that, typically, a source MAC address corresponds to the MAC address of the device transmitting a message and a destination MAC address corresponds to the MAC address of the intended device recipient of the message. One embodiment further comprises identifying a MAC address included in the association request as different from a hardware MAC address corresponding to the wireless client device. Alternatively or additionally, one embodiment further comprises identifying a media access control (MAC) address included in the association request as a randomly assigned MAC address. Alternatively or additionally, one embodiment further comprises identifying a media access control (MAC) address included in the association request as a randomly assigned MAC address. Alternatively or additionally, one embodiment further comprises identifying a media access control (MAC) address included in the association request as a locally administered MAC address.

In some embodiments, wireless client devices that repeatedly transmit association requests may be blacklisted or have their association requests discarded. This may be difficult, however, if a wireless client device is changing the MAC address for the multiple association requests. Embodiments described herein may make use of characteristics of the wireless client device in order to determine that a single wireless client device is responsible for repeated association requests even though the association requests use different MAC addresses. As described above, useful characteristics include, but are not limited to a true or hardware MAC address of the wireless client device, a tracking cookie present on the wireless client device, a device identifier corresponding to the wireless client device, a device profile corresponding to the wireless client device, authentication credentials corresponding to a user of the wireless client device, software credentials corresponding to a software component present on the wireless client device, a token corresponding to the wireless client device, a token corresponding to a user of the wireless client device, a wireless signature characterizing the wireless transmission/reception or broadcast characteristics of the wireless client device, a software profile of the wireless client device, a hardware profile of the wireless client device, an actual or predicted location of the wireless client device, and the like.

In a specific embodiment, a method of this aspect further comprises identifying a plurality of association requests related to or identified as originating from a single wireless client device, such as where each of the plurality of association requests include different media access control (MAC) addresses; and discarding additional association requests related to or identified as originating from the single wireless client device. Optionally, identifying includes identifying a characteristic related to the plurality of association requests, such as a characteristic that facilitates determining that the plurality of association requests originate from the single wireless client device. Optionally, identifying includes identifying a wireless signature related to the plurality of association requests, such as a wireless signature that facilitates determining that the plurality of association requests originate from the single wireless client device. Optionally, identifying includes using location information related to the plurality of association requests to facilitate determining that the plurality of association requests originate from the single wireless client device.

In some configurations, a wireless client device that associates with a network device may enter a sleep period during which no data messages are anticipated to be transmitted by the wireless client device. If a network device receives a data message addressed to a sleeping wireless client device, the network device may cache the data message for later delivery or may drop the data message. If a wireless client device is in a sleep period, transmitting an association query or a response to an association query may not be possible or may not result in a response message. Optionally, the predetermined time period corresponds to a wake-up period for the wireless client device. Optionally, the predetermined time period may be different from some or all of the client devices in communication and/or associated with the network device. As used herein, a wake-up period corresponds to a time period after which a sleeping wireless client device is required to awaken and respond to certain types of messages. If a wireless client device does not respond to an association query at the conclusion of the predetermined period, its entry in an association table may be deleted. In this way, sleeping devices will not have their association table entries inadvertently deleted.

For some embodiments, however, a wireless client that enters a sleep period immediately after association with a network device may have its association table entry deleted, such as when the wireless client device enters a sleep period before transmitting some data to the network device, such as network authentication data (e.g., 802.1X data), or a request for a dynamic internet protocol (IP) address using DHCP. For example, in one embodiment, a method of this aspect may further comprise determining that the wireless client device has entered a sleep period before a response to an association is received. Optionally, determining that a response to the association query is not received includes determining that the wireless client device has entered a sleep state.

In embodiments, sending association queries and receiving responses to the association queries may take time and/or use wireless capacity, so it may be desirable to limit the amount of association queries and responses transmitted. In one embodiment, transmission or association queries may only occur if the entries in the association table occupy a portion of the association table beyond a specified threshold. For example, in one embodiment, this method of deleting association table entries may be set to begin only when a threshold of half of the maximum size of the association table is filled with association entries. In this way, a network device can operate as normal for a considerable portion of time and only require responses to association queries for new wireless client devices if the association table entries go beyond the threshold number. For example, in one embodiment, a method of this aspect further comprises identifying a number of entries in the association table; and comparing the number of entries in the association table with a threshold value, such that transmitting the association query and monitoring for the response to the association query are performed when the number of entries is larger than the threshold value.

In other aspects, systems are provided, such as systems for performing the methods described herein. In exemplary embodiments, a system of this aspect comprises one or more processors, and a non-transitory computer readable storage medium communicatively coupled or otherwise positioned in data communication with the one or more processors. In embodiments, the non-transitory computer readable storage medium includes instructions that, when executed by the one or more hardware processors, cause the one or more hardware processors to perform one or more of the methods described herein.

For example, in a specific embodiment, a system of this aspect comprises one or more processors, and a non-transitory computer readable storage medium coupled with the one or more processors and including instructions that, when executed by the one or more processors, cause the one or more processors to perform operations including various steps of the method embodiments described above.

In other aspects, computer program products are provided, such as computer program products configured to achieve methods described herein. In exemplary embodiments, a computer program product of this aspect is a non-transitory computer readable storage medium comprising instructions that, when executed by one or more hardware processors, cause the one or more hardware processors to perform one or more of the methods described herein.

For example, in a specific embodiment, a computer program product of this aspect comprises a non-transitory computer readable storage medium comprising instructions that, when executed by one or more processors, cause the one or more processors to perform operations including various steps of the method embodiments described above.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
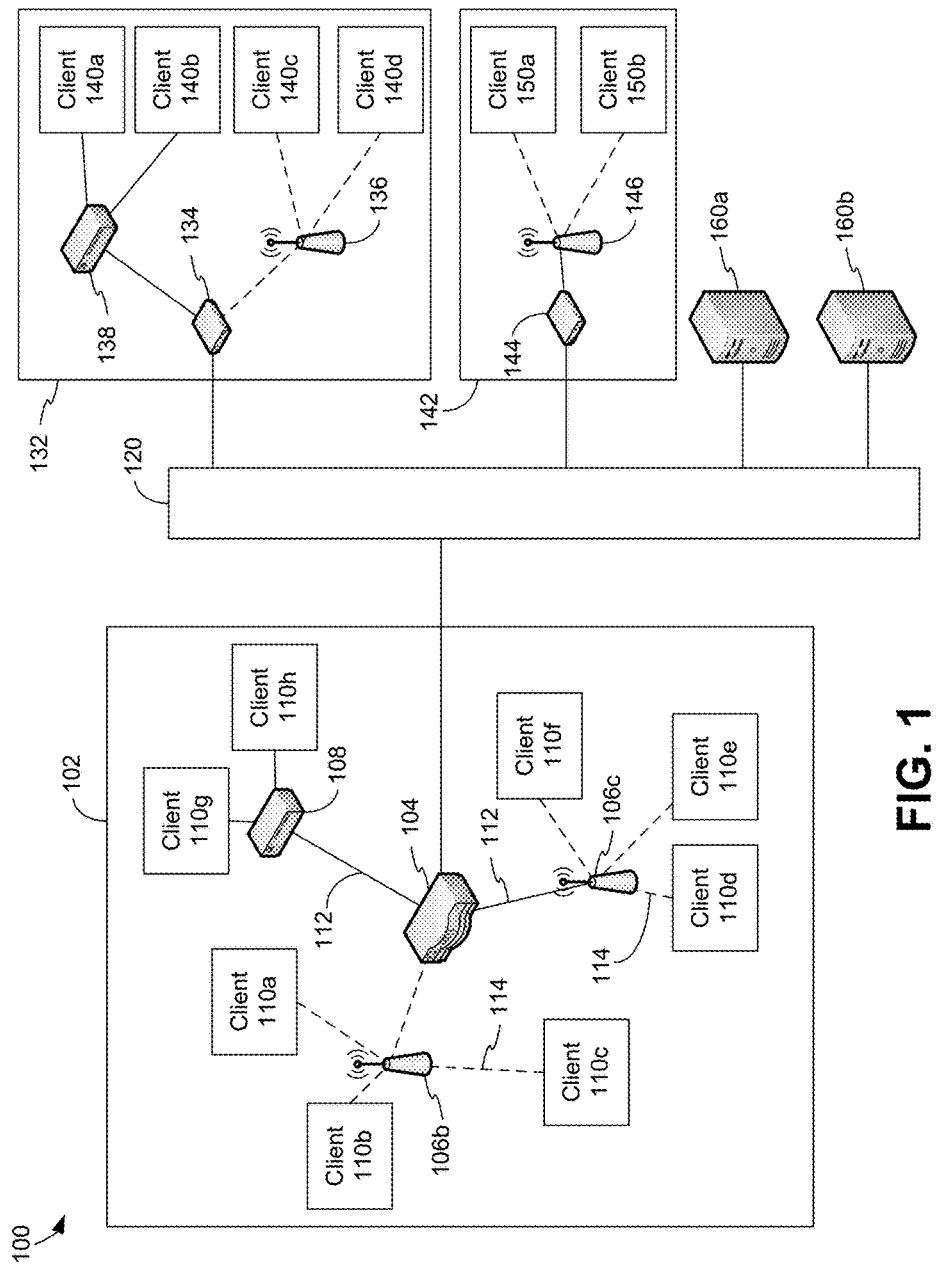
FIG. 1 illustrates a network configuration in accordance with some embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, an algorithm, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network, enterprise network, or a home network. The main office 102 network may be a private network. A private network is a network that may include security and access controls, such that only authorized users may access the private network. Authorized users may include, for example, employees of a company located in the main office 102.

In the illustrated embodiment, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 functions as a router for the devices in the main office 102.

A controller 104 may be any device that is operable to configure and manage network devices, such as the main office 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a and 106b. Switch 108 and wireless access points 106a-106b provide network connectivity to various client devices 110a, 110b, 110c, 110d, 110e, 110f, 110g, and 110h. Using a connection to switch 108 or access point 106a-106b, a client device 110a-110h is able to access network resources, including other devices on the network and the network 120.

Client devices 110a-110h include hardware devices that have processing circuitry running at least one process adapted to control the flow of traffic to and/or from the device, such as between the device and another device on a network, such as another client device or network infrastructure devices. Client devices may also include user input and output interfaces and communication interfaces, such as a radio for wireless communication and/or a physical connector for wired communication. Wireless client devices typically include a wireless radio compliant with a wireless networking standard, such as an IEEE 802.11 standard and are optionally adapted to associate with a wireless network infrastructure device, such as an access point. Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, printers, and the like.

Within the main office 102, a switch 108 is included as one example of a point of access to the network for wired client devices 110g and 110h. Client devices 110g and 110h may connect to the switch 108 and through the switch 108 may be able to access other devices within the network configuration 100. The client devices 110g and 110h may also be able to access the network 120, through the switch 108. The client devices 110g and 110h may communicate with the switch 108 over a wired connection 112. In the illustrated example, the switch 108 communicates with the controller 104 over a wired connection 112, though this connection may also be wireless.

Wireless access points 106a and 106b are included as another example of a point of access to the network for client devices 110a-110f. An access point 106a-106b is a combination of hardware, software, and/or firmware that is configured to provide wireless network connectivity to wireless client devices 110a-110f. In the illustrated embodiment, the access points 106a-106b can be managed and configured by the controller 104. The access points 106a-106b communicate with the controller 104 over either a wired connection 112 or a wireless connection 114.

Client devices within a network (e.g. wireless local area networks, or "WLANs") communicate with access points in order to obtain access to one or more network resources. An access point also referred to herein as an "AP", may include a digital device that operates as a gateway for a client device to establish a connection (e.g., a communicative coupling) with one or more networks (e.g., the Internet, an intranet, a local area network, etc.). For example, an access point may be implemented as a wireless access point (WAP), which is configured to communicate wirelessly with one or more client devices as well as communicate with other network devices associated with the one or more networks, such as a controller, router, or switch, for example, through a wired or wireless connection.

The network configuration 100 may include one or more remote sites 132, 142. A remote site 132 may be located in a different physical or geographical location from the main office 102. In some cases, the remote site 132 may be in the same geographical location, or possibly the same building, as the main office, 102, but may lack a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate with the network 120. The remote site 132 may also include a router, switch 138 and/or access point 136 in communication with the gateway 134 over either wired or wireless connections. The router, switch 138 and access point 136 provide connectivity to the network for various client devices 140a, 140b, 140c, and 140d.

In various embodiments, the remote site 132 is in direct communication with main office 102, such that client devices 140a-140d at the remote site 132 access the network resources at the main office 102 as if these clients 140a-140d were located at the main office 102. In such embodiments, the remote site 132 is managed by the controller 104 at the main office, and the controller 104 provides the necessary connectivity, security, and accessibility that enable communication between the remote site 132 and the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a and 150b access the network 120. Such a remote site 142 may represent, for example, an individual employee's home or a temporary remote office. The remote site 142 may also be in direct communication with the main office 102, such that the client devices 150a and 150b at remote site 142 access network resources at the main office 102 as if client devices 150a and 150b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include any number of intermediate network devices, such as switches, routers, gateways, servers, and/or controllers, that are not directly illustrated as part of the network configuration 100 but that facilitate communication between the various parts of the network configuration 100, and between the network configuration 100 and other network-connected entities. The network 120 may include various content servers 160a and 160b. Content servers 160a and 160b may include various providers of multimedia downloadable and/or streaming content, including audio, video, graphical, and/or text content, or any combination thereof. Examples of content servers 160a and 160b include, for example, web servers, streaming radio and video providers, and cable and satellite television providers. The client devices 110a-110h, 140a-140d, and 150a-150b may request and access the multimedia content provided by the content servers 160a and 160b.

Figure 2:
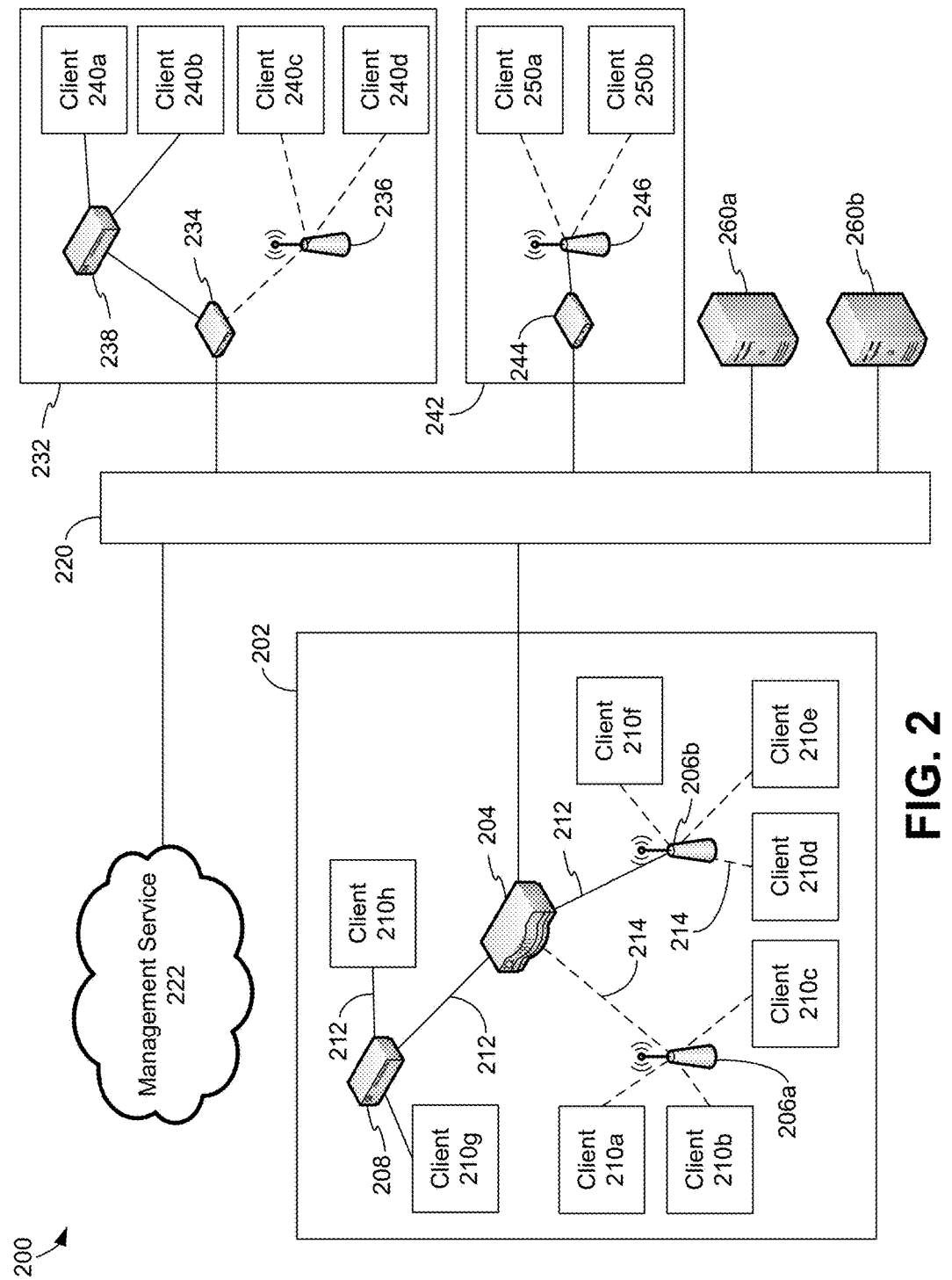
FIG. 2 illustrates a network configuration in accordance with some embodiments.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a and 206b. Switch 208 and access points 206a and 206b provide network connectivity to various client devices 210a, 210b, 210c, 210d, 210e, 210f, 210g, and 210h. Using a connection to switch 208 or access points 206a, 206b, a client device 210a-210h is able to access network resources, including other devices on the network and the network 220.

A switch 208 is included as an example of a point of access to the network for client devices 210g-210h. Client devices 210g-210h may communicate with the switch 208 over a wired connection 212. Wireless access points 206a-206b are included as another example of a point of access to the network for client devices 210a-210f. Client devices 210a-210f may communicate with the access points 206a-210b over wireless connections 214. The access points 206a-b may themselves communicate with the gateway device 204 over either wired connections 212 or wireless connections 214.

In the embodiment illustrated, the network configuration 200 includes a cloud-based management service 222. The management service 222 may include various software and software processes for configuring and/or managing network devices at the main office 202. Management tasks may include, for example, access, authentication, security, hardware management, configuration and set-up, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220 or by way of gateway device 204.

The network configuration 200 may include one or more remote sites 232, 242. A remote site 232 may include a gateway device 234 for communicating with the network 220. The remote site 232 may also include a router, switch 238 and/or access point 236 in communication with the gateway device 234 over either wired or wireless connections. The router, switch 238 and access point 236 provide connectivity to the network 220 for various client devices 240a, 240b, 240c, and 240d.

In various embodiments, the remote site 232 may be configured and/or managed by the management service 222, such that client devices 240a-240d at the remote site 232 access the network resources at the main office 202 as if these clients 240a-240d were located at the main office 202. The management service 222 provides all, or parts of, the necessary connectivity, security, and accessibility that enable communication between the remote site 232 and the main office 202.

In various embodiments, the network configuration 200 may also include one or more smaller remote sites 242, comprising only a gateway device 244 for communicating with the network 220 and a wireless access point 246, by which various client devices 250a and 250b access the network 220. The remote site 242 may also be configured and/or managed by the management service 222, such that the client devices 250a-250b at the remote site 242 access network resources at the main office 202 as if these client devices 250a-250b were located at the main office 202. The management service's 222 control over the remote site 242 makes this transparency possible.

The network 220 may be a public network, such as the Internet. The network 220 may include various content servers 260a and 260b. The client devices 210a-210h, 240a-240d, 250a-250b may request and access data and content provided by the content servers 260a-260b over their connection to the network 220.

Figure 3:
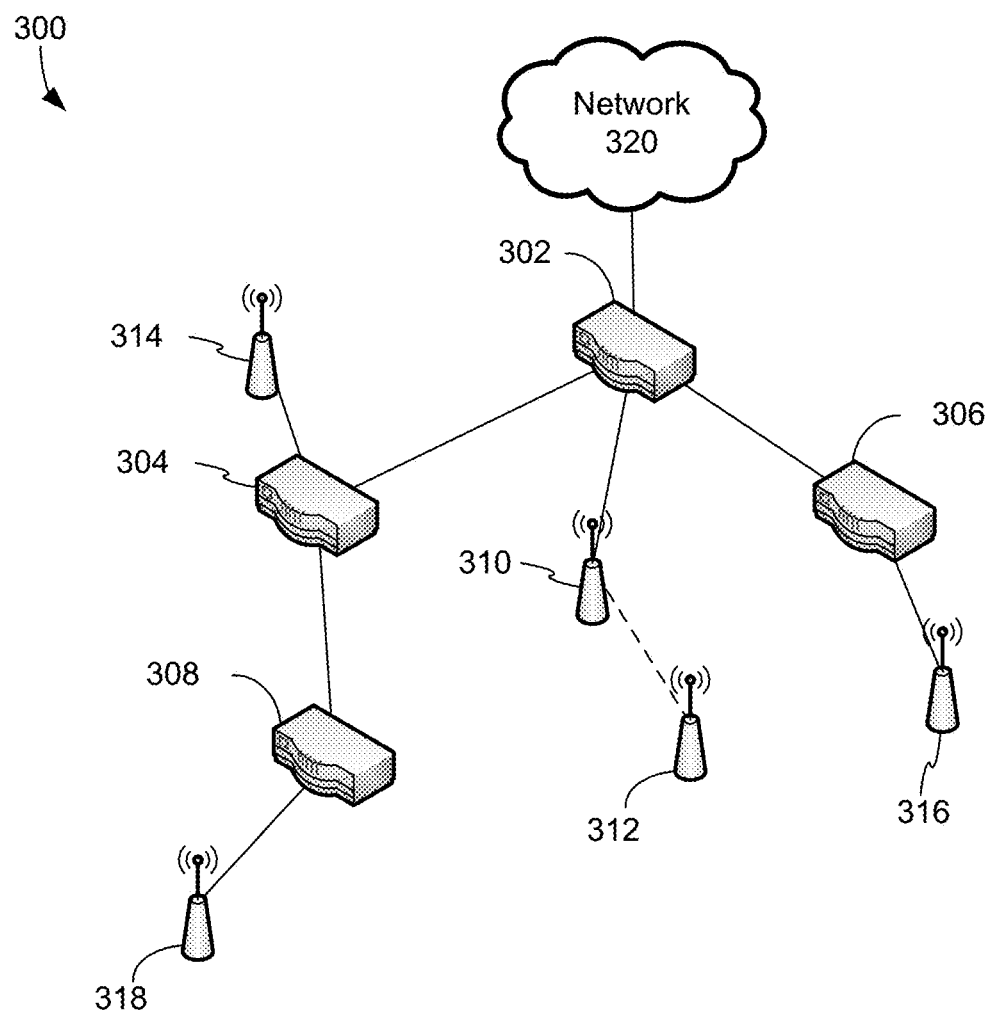
FIG. 3 illustrates a network configuration in accordance with some embodiments.

FIG. 3 illustrates an embodiment of a network configuration 300. As illustrated, controller 302 provides connectivity between network 320 and other network devices within network configuration 300, although connectivity with network 320 may be optionally provided by way of another device, such as network device 304 or one or more gateways, routers, switches, hubs, modems, etc. Controller 302 may include functionality of a router, switch, gateway, access point, etc., in order to provide network connectivity with network 320 and between other devices within network configuration 300. Controller 302 may optionally include a wireless access point. Controller 302 may also function as a central management point for other devices within network configuration 300, such as wired and/or wireless network devices, and may provide addressing services, configuration control, routing services, and the like.

As illustrated, network devices 304 and 306 are connected to controller 302 by way of direct network connections, though embodiments are contemplated where one or more intermediate devices and/or networks are positioned between network devices 304, 306 and controller 302 and/or where network devices 304, 306 are wirelessly connected to controller 302. In turn, network device 304 provides network access between network device 308 and controller 302. Network devices 304, 306, and 308 may function as switches, routers, hubs, gateways, access points, etc., and may also provide network connectivity to one or more wired client devices (not shown).

Wireless access point 310 also connects to controller 302 by a direct network connection and may provide wireless access to network services to one or more wireless client devices (not shown). Wireless access point 310 may also provide wireless access between controller 302 and wireless access point 312, with wireless access point 312 optionally functioning as a wireless range extender or wireless bridge and providing wireless connectivity to other wireless client devices (not shown). Wireless access points 314, 316, and 318 are illustrated as respectively connected to network devices 304, 306, and 308, and may provide network connectivity to one or more wireless client devices. As illustrated, wireless access points 310, 312, 314, 316, and 318 are managed by controller 302, which provides configuration, addressing, routing, and other services to facilitate wireless access points 310, 312, 314, 316, and 318 providing network connectivity to wireless client devices. Controller 302 may optionally provide additional services, such as authentication services, to wired network devices, wired client devices, wireless access points, and wireless client devices of network configuration 300.

Figure 4:
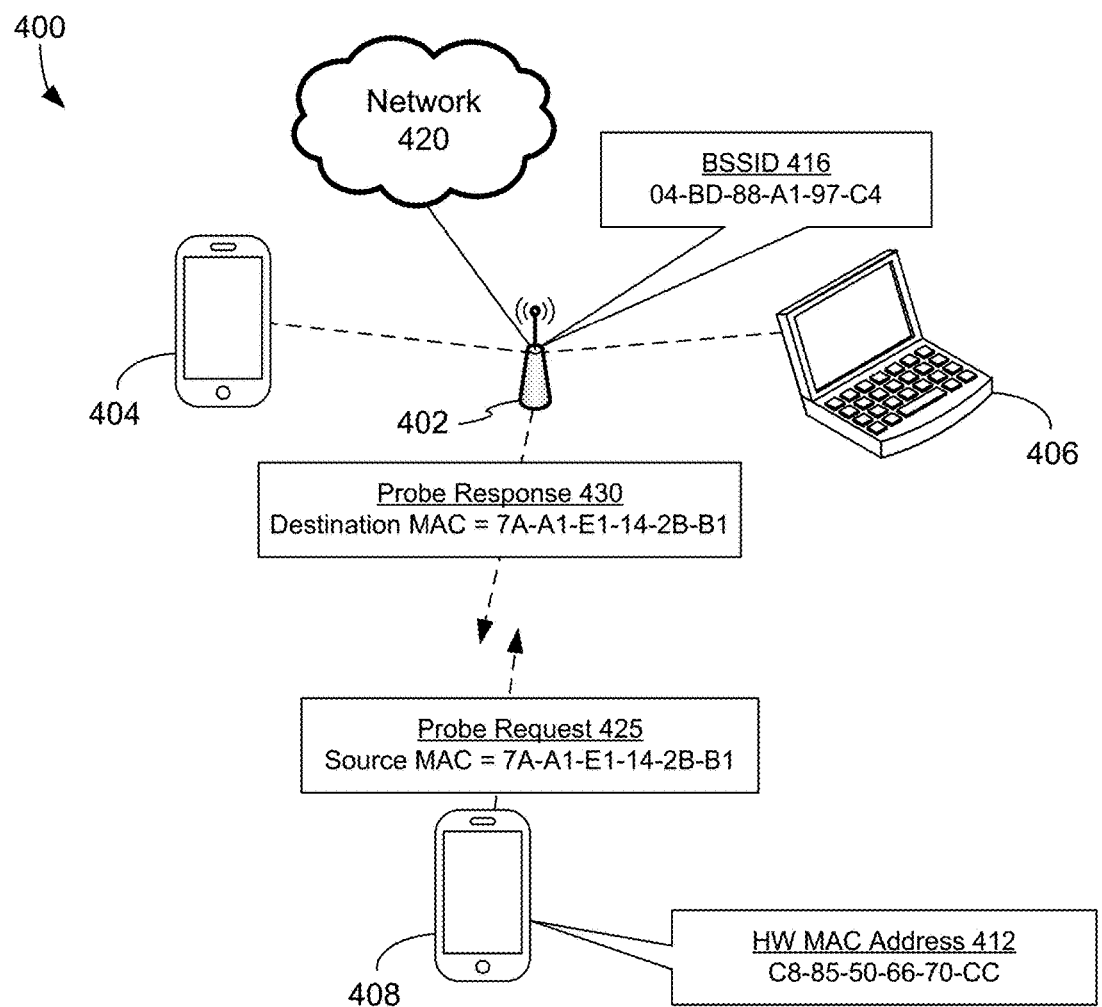
FIG. 4 illustrates a network configuration in accordance with some embodiments.

FIG. 4 illustrates a network configuration 400, which may optionally represent a subset of any of network configurations 100, 200, and/or 300. For example, network 420 may represent any the remainder of any of network configurations 100, 200, and/or 300 that are not illustrated explicitly in FIG. 4.

In FIG. 4, wireless access point 402 provides network connectivity to associated wireless client devices 404 and 406. Wireless client device 408, however, is illustrated as not associated with wireless access point 402. Although wireless client device 408 is not associated with wireless access point 402, wireless client device 408 and wireless access point 402 may still exchange data communications, such as sending or receiving probe requests/responses, or for establishing a wireless association or other purposes.

For example, wireless client device 408 may transmit probe request frames, action frames, authentication frames, and other class 1 wireless frames, such as class 1 control or management frames, which may be received and processed by wireless access point 402, even though client device 408 is not associated with wireless access point 402. Similarly, wireless access point 402 may transmit beacon frames, probe response frames, and other class 1 wireless frames, such as class 1 control or management frames, which may be received and processed by wireless client device 408, even though client device 408 is not associated with wireless access point 402.

As will be understood by the skilled artisan, the data communications that are exchanged between wireless client device 408 and wireless access point 402 may reveal a media access control (MAC) address of wireless client device 408. In embodiments, use of a MAC address of wireless client device 408 ensures that data communications transmitted by wireless access point 402 for receipt by wireless client device 408 will not be acted upon by another wireless client device that may receive the data communications.

Although wireless client device 408 may have a hardware (HW) MAC address 412, also called a manufacturer assigned or true MAC address, wireless client device 408 may use another MAC address for these pre-association data communications, such as a random MAC address. For example, as illustrated, the hardware MAC 412 address of wireless client device 408 is C8-85-50-66-70-CC, but the random MAC address communicated in the probe request 425 is 7A-A1-E1-14-2B-B1. In response to the probe request 425, the access point 402 transmits probe response 430, identifying as the destination MAC address the source MAC address in probe request 425 (in this example, 7A-A1-E1-14-2B-B1).

Figure 5:
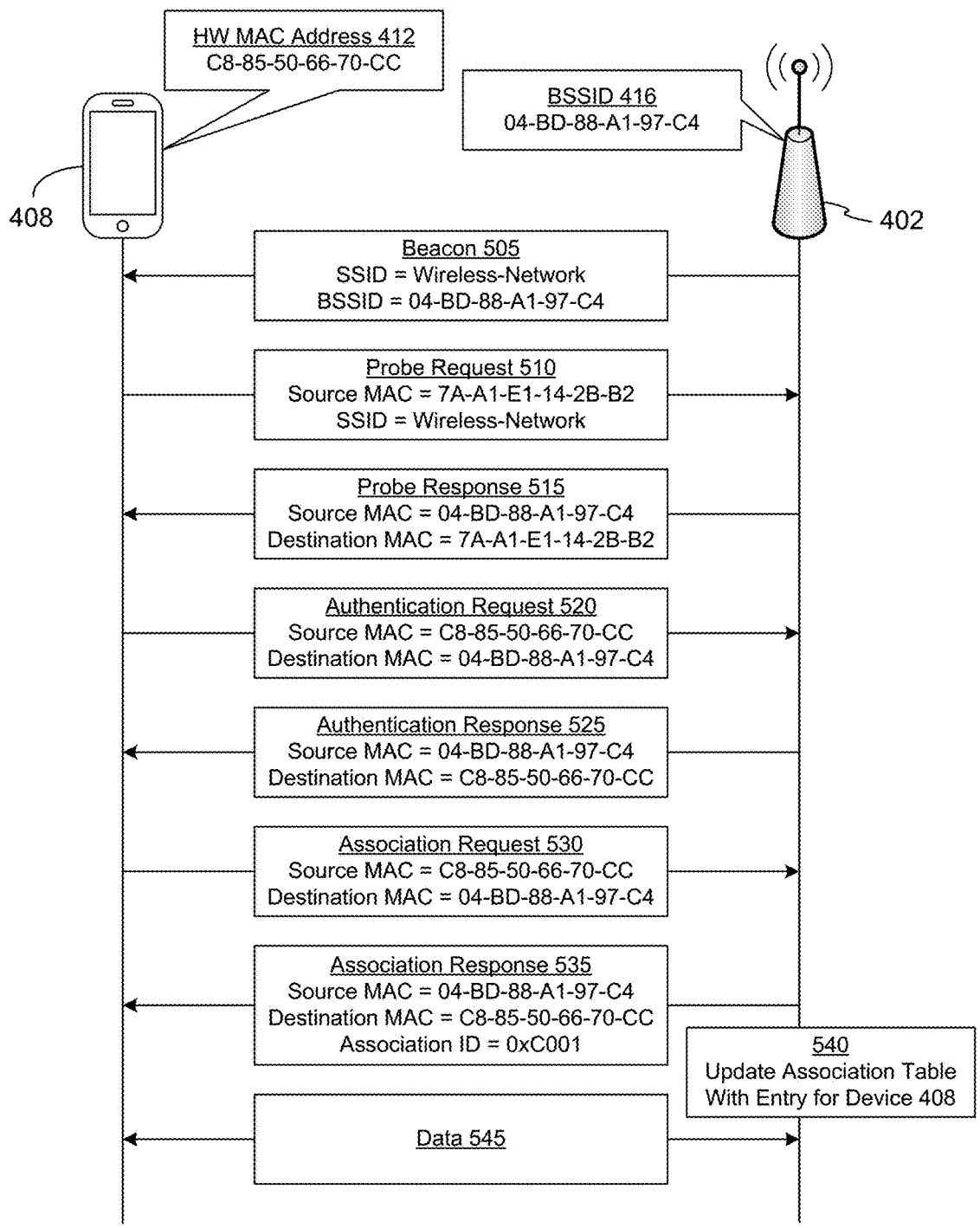
FIG. 5 illustrates an overview of the exchange of messages between devices during a wireless association process in accordance with some embodiments.

FIG. 5 illustrates an overview of the exchange of data messages between wireless client device 408 and access point 402 during a wireless association process. Initially, access point 402 may transmit a beacon 505. Beacon 505 includes the service set identifier (SSID) "Wireless-Network" and the basic service set identifier (BSSID) of the access point 402. As will be understood by the skilled artisan, the BSSID of the access point 402 may correspond to the wireless MAC address of access point 402.

Wireless client device 408 transmits a probe request 510, which includes a source MAC address selected for wireless client device 408. As described previously, wireless client device 408 may optionally use an alternative MAC address that is different from HW MAC address 412. As will be understood by the skilled artisan, probe request 510 may use stored information or information from beacon 505 and correspond to a directed probe request that identifies a wireless network by SSID. Alternatively, probe request 510 may be a broadcast probe that does not include an SSID (or may specify a null SSID), in which case all access points that receive the probe request 510 may generate a probe response. As illustrated, probe request 510 includes the SSID "Wireless-Network", which corresponds to the SSID in use by access point 402.

Access point 402 receives probe request 510 and transmits probe response 515. The MAC address/BSSID 416 of access point 402 is identified in probe response 515 as the source MAC address. Probe response 515 also includes a destination MAC address that matches the source MAC address included in probe request 510, namely the random MAC address transmitted by wireless client device 408. In this way, the HW MAC address 412 has been masked from access point 402 during the process of transmitting and receiving probe request 510 and probe response 515.

When wireless client device 408 is ready to associate with access point 402, wireless client device 408 transmits an authentication request 520. As illustrated, authentication request 520 identifies the source MAC address as the HW MAC address 412 of wireless client device 408. In some embodiments, however, wireless client device 408 may continue to use a MAC address other than its HW MAC address 412 for authentication with wireless access point 402. Authentication request 520 further includes BSSID 416 as the destination MAC address. The skilled artisan will appreciate that other information may be included in authentication request 520, for example, as required by a wireless networking standard, such as an IEEE 802.11 standard.

After receiving authentication request 520, access point 402 may confirm or otherwise act upon the information included in authentication request 520 and generate and transmit an authentication response 525. As illustrated, authentication response 525 includes a source MAC address corresponding to BSSID 416 and a destination MAC address corresponding to the source MAC address included in authentication request 520, namely, in this example, HW MAC address 412. Again, the skilled artisan will appreciate the information and process required for authentication of wireless client device 408, the generation of authentication response 525, and other information that may be included in authentication response 525.

To continue the association process, with access point 402, wireless client device 408 transmits an association request 530. As illustrated, association request 530 identifies the source MAC address as the HW MAC address 412 of wireless client device 408, and BSSID 416 as the destination MAC address. Once again, the skilled artisan will appreciate that other information that may be included in association request 530.

After receiving association request 530, access point 402 may confirm or otherwise act upon the information included in association request 530 and generate and transmit an association response 535. As illustrated, association response 535 includes a source MAC address corresponding to BSSID 416 and a destination MAC address corresponding to the source MAC address included in association request 530, namely, in this example, HW MAC address 412. Again, the skilled artisan will appreciate that other information may be included in association response 535. For example, association response 535 further includes an association ID. Upon receiving the association response 535 including the association ID, the wireless client device 408 may consider itself as associated with access point 402.

In addition to transmitting association response 535, access point 402 further updates an association table, at 540, with an entry for wireless client device 408, which may identify wireless client device 408 by the association ID, and HW MAC address, which was included in authentication request 520 and association request 530 as the source MAC address of these messages. Although the updating of the association table is shown as occurring after association response 535 is transmitted, the association table may be updated before or simultaneous with transmission of association response 535. After successful association, wireless client device 408 and access point 402 can exchange data 545 with one another.

Figure 6:
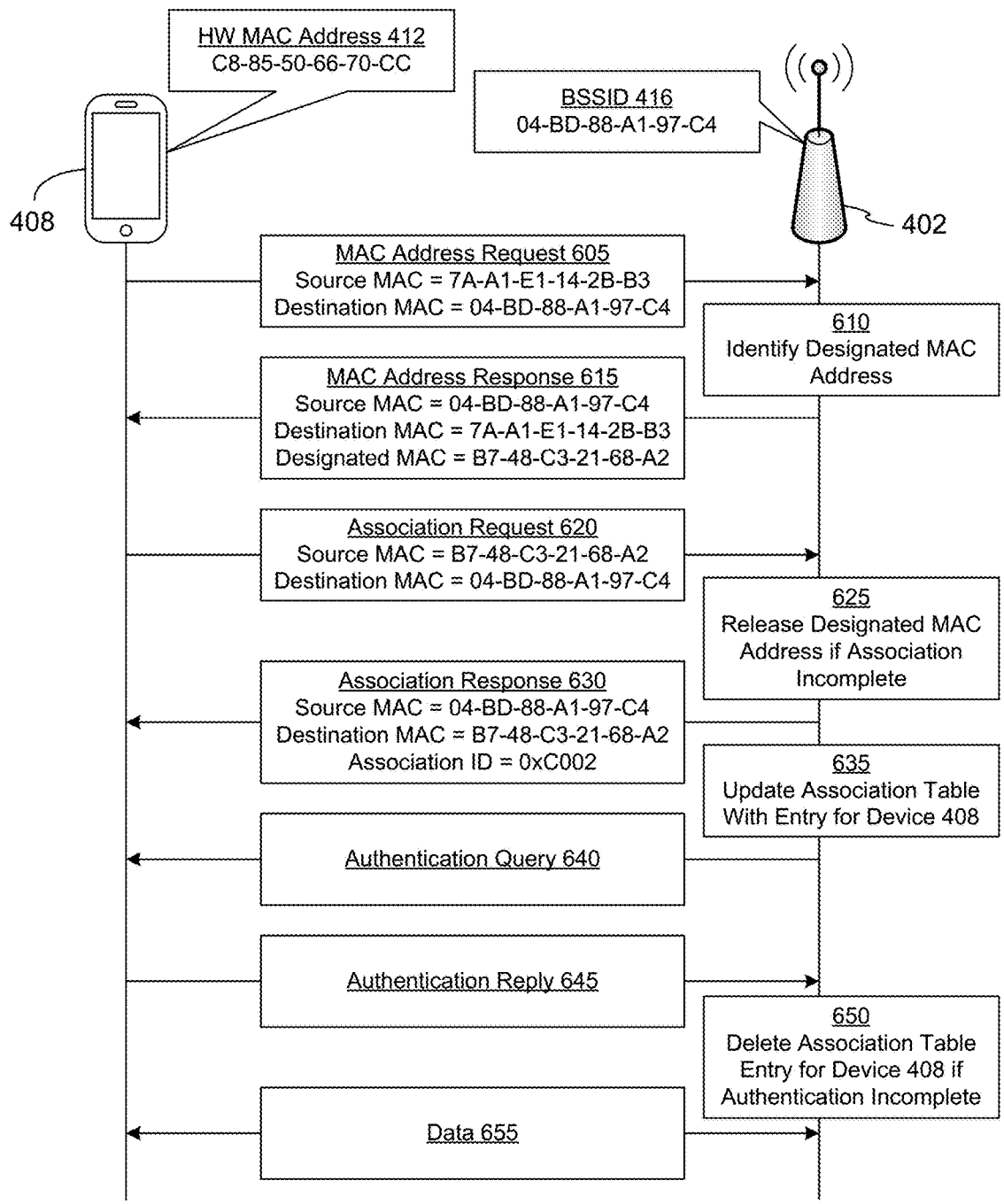
FIG. 6 illustrates an overview of the exchange of messages between devices during a wireless association process in accordance with some embodiments.

FIG. 6 illustrates an overview of the exchange of data messages between wireless client device 408 and access point 402 during a wireless association process of another embodiment. As will be understood by the skilled artisan making reference to FIG. 5, beacon signals, probe requests, probe responses, authentication requests, and authentication responses may be exchanged between wireless client device 408 and access point 402 before and during a wireless association process. So as not to obscure FIG. 6 with excessive detail, however, beacon signals, probe requests, probe responses, authentication requests, and authentication responses are not illustrated.

As illustrated, wireless client device 408 transmits a MAC address request 605 that identifies a source MAC address and BSSID 416 as the destination MAC address. For example the source MAC address included in MAC address request 605 may be a random and/or locally administered MAC address. In some embodiments, however, the source MAC address is the HW MAC address 412 of wireless client device 408.

In response to receiving MAC address request 605, access point 402 may identify, at 610, a designated MAC address for use by wireless client device 408. The designated MAC address may be included in MAC address response 615 that is transmitted by access point 402 for receipt by wireless client device 408. Access point 402 may indicate that the identified designated MAC address has been reserved for use by wireless client device 408, such as in a reservation table or other database or list accessible by access point 402. For example, access point 402 may track wireless client device 408 using the source MAC address included in MAC address request 605 or another identifier or characteristic of wireless client device 408.

As illustrated, MAC address request 605 and MAC address response 615 are transmitted prior to wireless association between wireless client device 408 and access point 402. Accordingly, MAC address request 605 and MAC address response 615 may be transmitted in or as class 1 management frames, action frames, authentication frames, and/or probe request/probe response frames. Other embodiments are possible.

In one embodiment, MAC address request 605 may correspond to a probe request that includes a random or locally managed MAC address as the source MAC address. Optionally, this probe request may not have any other indicators of the probe request being a request for a designated MAC address. For example, the wireless client may send a standard probe request and not one that specifically requests a designated MAC address. Whether or not a specific request for a designated MAC address is made, however, in this embodiment, access point 402 may treat the probe request as a request for a designated MAC address request, and, in response, transmit a probe response that includes an identified designated MAC address.

As illustrated, after receiving MAC address response 615, wireless client device 408 transmits an association request 620 that includes the designated MAC address as the source MAC address and BSSID 416 as the destination MAC address. The skilled artisan will appreciate that other information that may be included in association request 620.

If the wireless client device fails to use the designated MAC address in the association request 620 or if association fails or is not completed, at 625 the designated MAC address is released or marked as unreserved, making the designated MAC address available for use by other wireless client devices.

After receiving association request 620, access point 402 may confirm or otherwise act upon the information included in association request 620 and generate and transmit an association response 630. As illustrated, association response 630 includes a source MAC address corresponding to BSSID 416 and a destination MAC address corresponding to the designated MAC address included as the source MAC address in association request 620. Again, the skilled artisan will appreciate that other information that may be included in association response 630. For example, association response 630 further includes an association ID. Upon receiving the association response 630 including the association ID, the wireless client device 408 may consider itself as associated with access point 402.

In addition to transmitting association response 630, access point 402 further updates an association table, at 635, with an entry for wireless client device 408, which may identify wireless client device 408 by the association ID, and/or designated MAC address. Although the updating of the association table is shown as occurring after association response 630 is transmitted, the association table may be updated before or simultaneous with transmission of association response 630. The association table may be located on the access point 402, or on a controller or other network device.

After successful association, wireless client device 408 and access point 402 may be able to exchange data 655 with one another. In some embodiments, however, only certain data may be transmitted, such as data required for authenticating wireless client device 408. As illustrated in FIG. 6, access point 402 may transmit an authentication query 640 for receipt by wireless client device 408. Following this, wireless client device 408 may transmit a response to the authentication query, also called an authentication reply 645, for receipt by wireless access point 402. For example, authentication query 640 and authentication reply 645 may correspond to data messages exchanged between wireless client device 408 and wireless access point 402 during an IEEE 802.1X authentication process. Optionally, authentication query 640 and authentication reply 645 may correspond to data messages exchanged between wireless client device 408 and wireless access point 402 during a wireless authentication process. In some embodiments, additional types of data may be exchanged between wireless client device 408 and access point 402 but, prior to an authentication process, access point 402 may not allow transmission over the network of certain data or messages originating from wireless client device 408 that have a destination address different from access point 402 and/or may not allow transmission to wireless client device of certain data or messages received by access point 402 from other devices over the network.

After successful authentication, data 655 may be exchanged between wireless client device 408 and access point 402. If authentication remains incomplete, such as upon a timer elapsing or the wireless client device 408 begins using a different MAC address from the designated MAC address after authentication, the association table entry corresponding to wireless client device 408 may be deleted or removed from the association table, at 650. Alternatively or additionally, the designated MAC address may be released for use by another wireless client device.

Figure 7A:
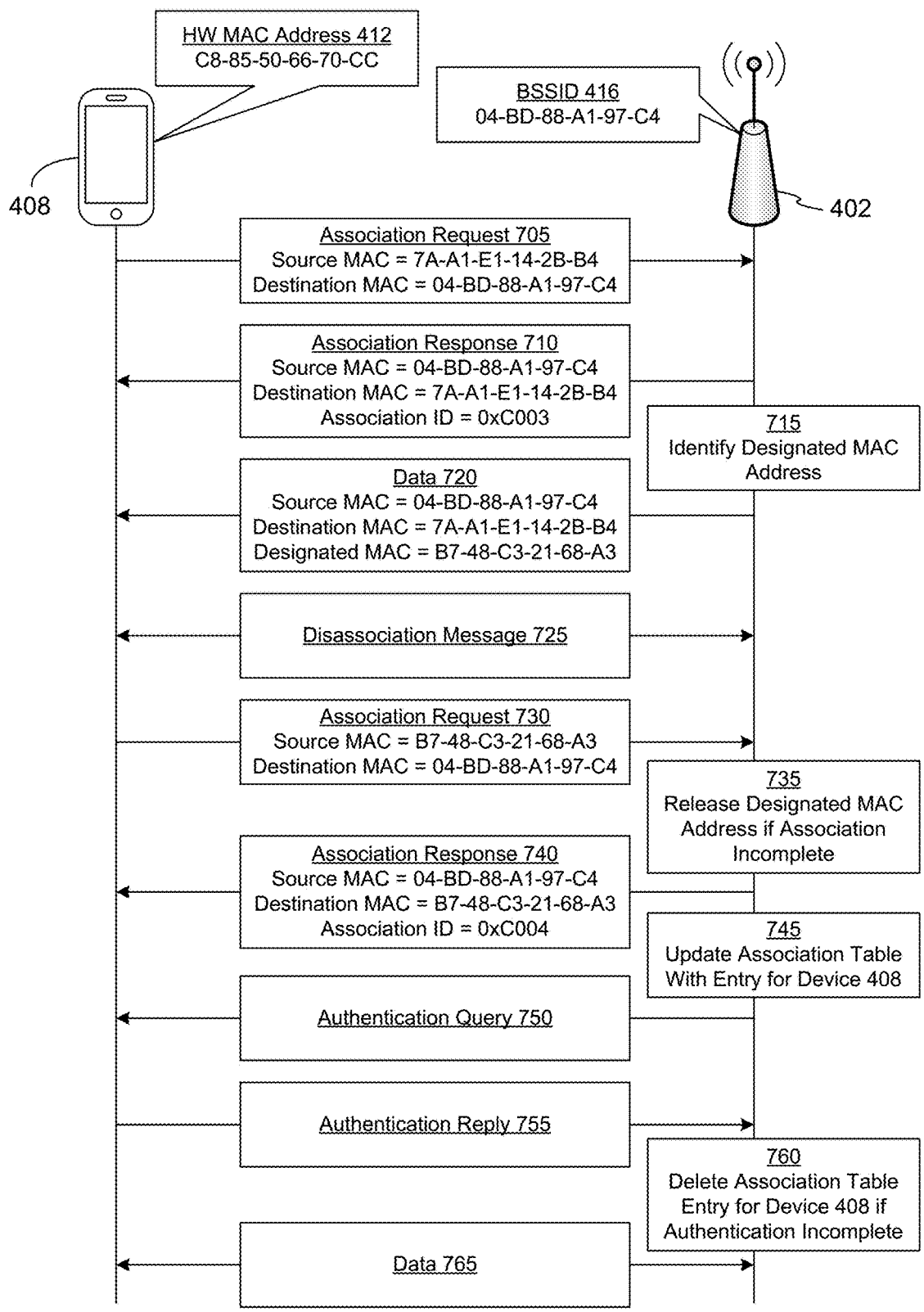
FIG. 7A and FIG. 7B illustrate overviews of the exchange of messages between devices during a wireless association process in accordance with some embodiments.
Figure 7B:
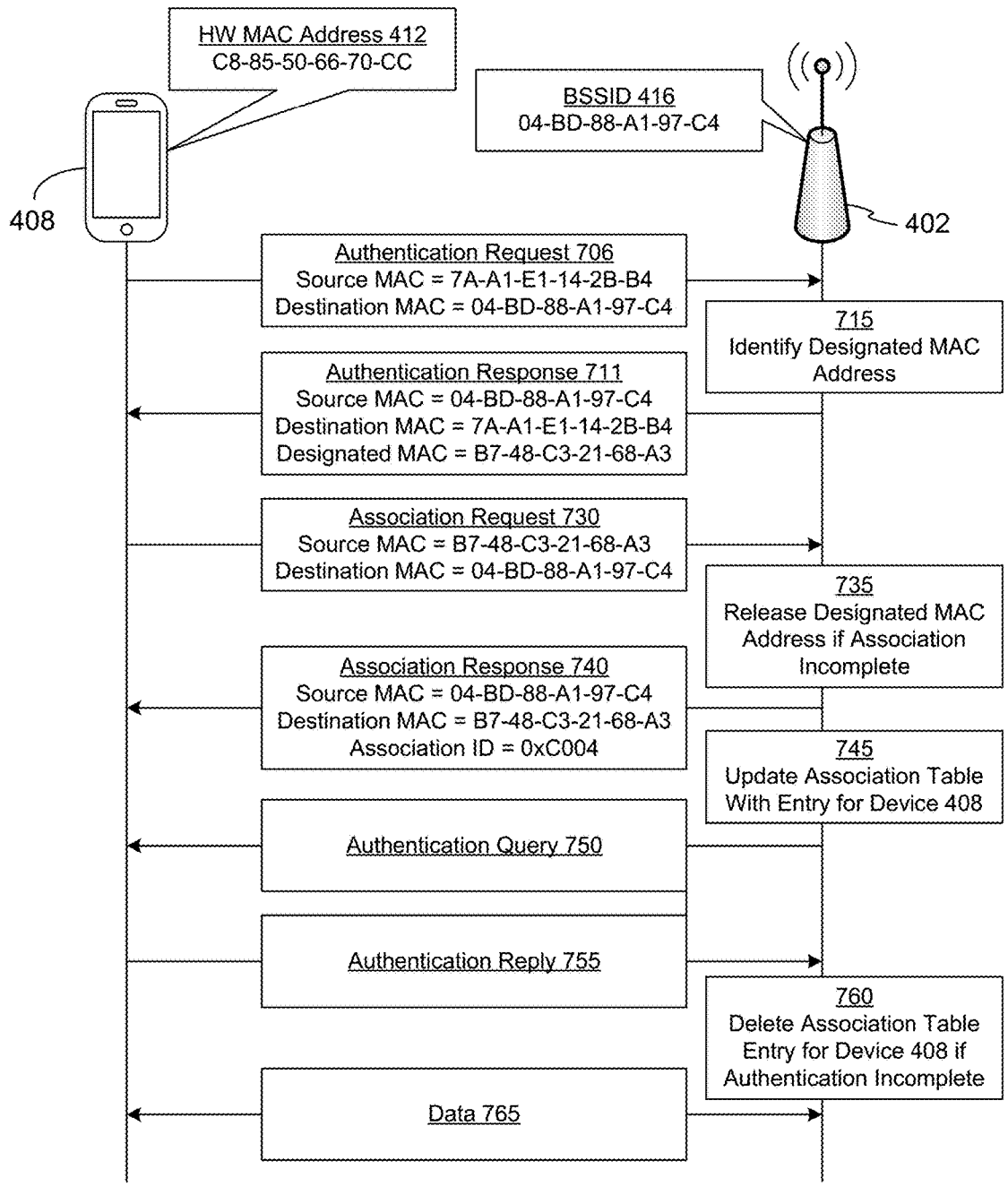

FIG. 7A and FIG. 7B illustrate overviews of the exchange of data messages between wireless client device 408 and access point 402 during a wireless association process of another embodiment. As will be understood by the skilled artisan making reference to FIG. 5, beacon signals, probe requests, probe responses, authentication requests, and authentication responses may be exchanged between wireless client device 408 and access point 402 during a wireless association process. So as not to obscure FIG. 7A and FIG. 7B with excessive detail, however, beacon signals, probe requests, probe responses, authentication requests, and authentication responses may not be illustrated.

As illustrated, in FIG. 7A, wireless client device 408 transmits an association request 705 that identifies a source MAC address and BSSID 416 as the destination MAC address. For example, the source MAC address included in association request 705 may be a random and/or locally administered MAC address. In some embodiments, however, the source MAC address is the HW MAC address 412 of wireless client device 408.

In response to receiving association request 705, access point 402 may transmit an association response including an association ID. Upon receiving the association response 630 including the association ID, the wireless client device 408 may consider itself as associated with access point 402. Additionally, access point 402 may identify, at 715, a designated MAC address for use by wireless client device 408. The designated MAC address may be included in association response 710 that is transmitted by access point 402 for receipt by wireless client device 408 or may be included in a separate data message 720. Access point 402 may identify designated MAC address as having been reserved for use by wireless client device 408, such as by an entry in a reservation table or other database or list accessible by access point 402. For example, access point 402 may track wireless client device 408 using the source MAC address included in MAC address request 605 or another identifier or characteristic of wireless client device 408.

After the designated MAC address is communicated to wireless client device 408, one or more disassociation messages are exchanged between wireless client device 408 and access point 402. For example, access point 402 may transmit a deauthentication frame or a disassociation frame. Alternatively or additionally, if properly configured to do so, wireless client device 408 may transmit a deauthentication frame or a disassociation frame upon receipt of the designated MAC address. For example, then, the association corresponding to the association ID included in association response 710 is terminated.

As illustrated, in FIG. 7B, wireless client device 408 transmits an authentication request 706 that identifies a source MAC address and BSSID 416 as the destination MAC address. For example, the source MAC address included in authentication request 706 may be a random and/or locally administered MAC address. In some embodiments, however, the source MAC address is the HW MAC address 412 of wireless client device 408.

In response to receiving authentication request 706, access point 402 may identify, at 715, a designated MAC address for use by wireless client device 408. The designated MAC address may be included in authentication response 711 that is transmitted by access point 402. Access point 402 may identify designated MAC address as having been reserved for use by wireless client device 408, such as by an entry in a reservation table or other database or list accessible by access point 402. For example, access point 402 may track wireless client device 408 using the source MAC address included in MAC address request 605 or another identifier or characteristic of wireless client device 408.

As illustrated in both FIG. 7A and FIG. 7B, An association request 730 is transmitted by wireless client device 408 that includes the designated MAC address as the source address. Other information beyond that illustrated may be included in the association request 730.

If association fails or is otherwise incomplete, at 735 the designated MAC address is released or marked as unreserved, making the designated MAC address available for use by other wireless client devices.

After receiving association request 730, access point 402 may confirm or otherwise act upon the information included in association request 730 and generate and transmit an association response 740. As illustrated, association response 740 includes a source MAC address corresponding to BSSID 416 and a destination MAC address corresponding to the designated MAC address included as the source MAC address in association request 730. Again, the skilled artisan will appreciate that other information that may be included in association response 740. For example, association response 740 further includes a new association ID. Upon receiving the association response 740 including the association ID, the wireless client device 408 may consider itself as associated with access point 402. Upon receiving the association response 740 including the association ID, the wireless client device 408 may again consider itself as associated with access point 402 but now will be associated with reference to the designated MAC address.

In addition to transmitting association response 740, access point 402 further updates an association table, at 745, with an entry for wireless client device 408, which may identify wireless client device 408 by the association ID, and/or designated MAC address. Although the updating of the association table is shown as occurring after association response 740 is transmitted, the association table may be updated before or simultaneous with transmission of association response 740.

After successful association, wireless client device 408 and access point 402 may be able to exchange data 765 with one another. In some embodiments, however, only certain data may be transmitted, such as data required for authenticating wireless client device 408. As illustrated in FIG. 7A and FIG. 7B, access point 402 may transmit an authentication query 750 for receipt by wireless client device 408. Following this, wireless client device 408 may transmit an authentication reply 755 for receipt by wireless access point 402. For example, authentication query 750 and authentication reply 755 may correspond to data messages exchanged between wireless client device 408 and wireless access point 402 during an IEEE 802.1X authentication process or wireless authentication process. Optionally, authentication query 750 and authentication reply 755 may correspond to data messages exchanged between wireless client device 408 and wireless access point 402 during a wireless authentication process.

After successful authentication, data 765 may be exchanged between wireless client device 408 and access point 402. If authentication remains incomplete, such as upon a timer elapsing, the association table entry corresponding to wireless client device 408 may be deleted or removed from the association table, at 760. Additionally or alternatively, the designated MAC address may be released for use by another wireless client device.

Allowing the use of random or locally administered MAC addresses may make an access point vulnerable to a denial of service (DOS) type attack. For example, a device may repeatedly associate with an access point, creating multiple entries in an association table, with each association using a distinct MAC address, and thereby occupy all entries in an association table and prevent additional wireless client devices from associating with the access point.

Figure 8:
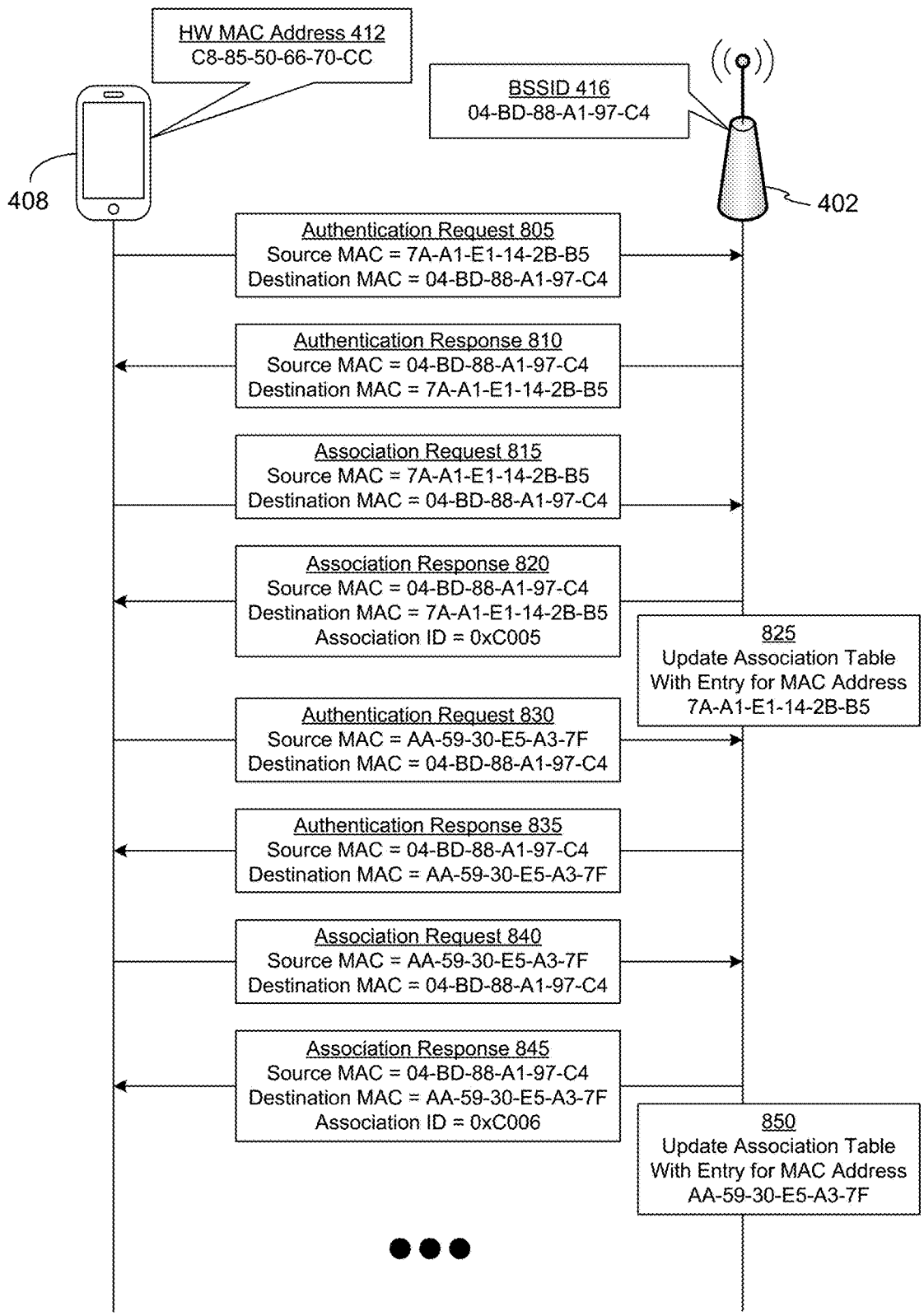
FIG. 8 illustrates an overview of a wireless denial of service attack in accordance with some embodiments.

FIG. 8 provides an overview of a wireless DOS attack in which wireless client device 408 repeatedly associates with access point 402. As illustrated, wireless client device 408 transmits an authentication request 805 that includes a source MAC address, such as a source MAC address different from the HW MAC address 412 of wireless client device 408. In response, upon successful authentication (e.g., open systems authentication), access point 402 transmits authentication response 810. Wireless client device 408 then transmits an association request 815 that includes a different source MAC address from that in the original association request 805. Access point 402 then transmits an association response 820 including an association ID and updates an association table, at 825, with an entry for the MAC address included as the source MAC address in authentication request 805 and association request 815.

To continue the DOS attack, wireless client device 408 transmits an authentication request 830 that includes a source MAC address different from the source MAC address included in authentication request 805 and association request 815. In response, upon successful authentication (e.g., open systems authentication), access point 402 transmits authentication response 835. Wireless client device 408 then transmits an association request 840. Access point 402 then transmits an association response 845 including an association ID and updates an association table, at 850, with an entry for the MAC address included as the source MAC address in authentication request 830 and association request 840. This process may be repeated by wireless client device 408 until the association table is full and cannot accept additional entries.

Figure 9:
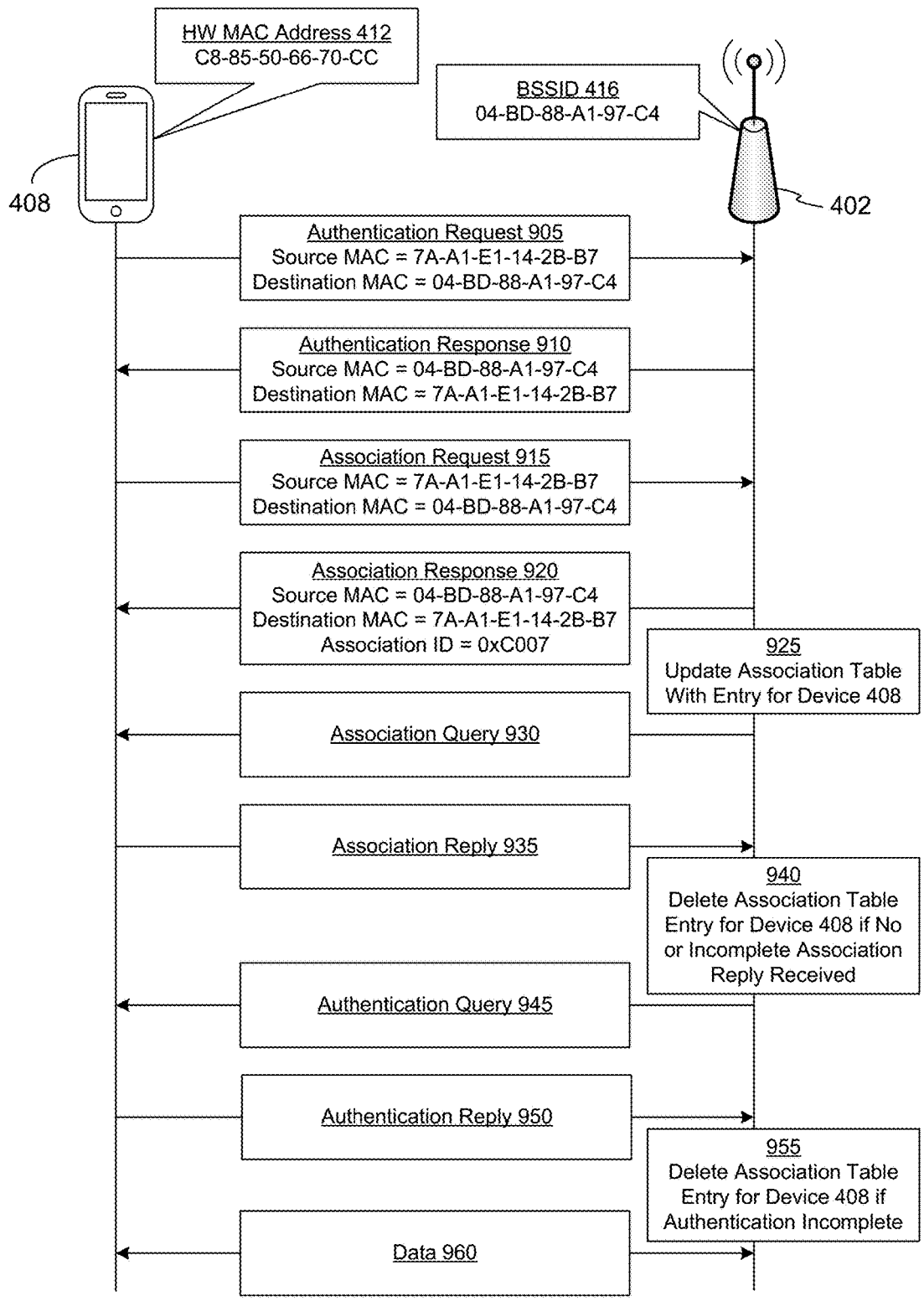
FIG. 9 illustrates an overview of the exchange of messages between devices during a wireless association process in accordance with some embodiments.

Embodiments are contemplated herein for minimizing such a DOS attack by requiring additional data exchange between a wireless client device and an access point for creation or maintaining of an association table entry. FIG. 9 illustrates an overview of the exchange of data messages between wireless client device 408 and access point 402 during a wireless association process of an embodiment for preventing a DOS attack.

In FIG. 9, wireless client device 408 transmits an authentication request 905, which may include a random and/or locally administered MAC address. Optionally, authentication request may include HW MAC address 412. The skilled artisan will understand additional information that may be included in authentication request 905.

After receiving authentication request 905, access point 402 may confirm or otherwise act upon the information included in authentication request 905 and generate and transmit an authentication response 910. As illustrated, authentication response 910 includes a source MAC address corresponding to BSSID 416 and a destination MAC address corresponding to the source MAC address included in authentication request 905. Again, the skilled artisan will appreciate the information and process required for authentication of wireless client device 408, the generation of authentication response 910, and other information that may be included in authentication response 910.

To continue the association process, with access point 402, wireless client device 408 transmits an association request 915. As illustrated, association request 915 identifies the same source and destination MAC addresses included in authentication request 905. Once again, the skilled artisan will appreciate that other information that may be included in association request 915.

After receiving association request 915, access point 402 may confirm or otherwise act upon the information included in association request 915 and generate and transmit an association response 920. As illustrated, association response 535 includes a source MAC address corresponding to BSSID 416 and a destination MAC address corresponding to the source MAC address included in association request 915. Again, the skilled artisan will appreciate that other information that may be included in association response 920. For example, association response 920 further includes an association ID. Upon receiving the association response 920 including the association ID, the wireless client device 408 may consider itself as associated with access point 402.

In addition to transmitting association response 920, access point 402 further updates an association table, at 925, with an entry for wireless client device 408, which may identify wireless client device 408 by the association ID, and MAC address that was included as the source MAC address in authentication request 905 and association request 915. Although the updating of the association table is shown as occurring after association response 920 is transmitted, the association table may be updated before or simultaneous with transmission of association response 920. After successful association, wireless client device 408 and access point 402 may be able to exchange data 960 with one another.

For purposes of preventing the association table from filling up with erroneous or abandoned entries, access point 402 may transmit an association query 930 for which an association reply 935 is required. For example, association query may include a series of one or more null data packets (NDPs), and association reply 935 may include one or more acknowledgment (ACK) signals. If no or only an incomplete association reply 935 is received, the entry for wireless client device 408 in the association table is deleted. In this way, association table entries are only maintained for wireless client devices which are associated with the access point for long enough to successfully reply to an association query.

Although illustrated as separate steps, 925 and 940 may be combined. For example, the association table entry may not be created until after a successful association reply 935 is received at access point 402. In this way, only devices which pass the association reply 935 requirement are given association table entries. Such a configuration minimizes the addition and subsequent deletion of association table entries by only creating table entries if a suitable association reply 935 is received or never creating table entries for devices which do not generate a suitable association reply.

After successful association, wireless client device 408 and access point 402 may be able to exchange data 960 with one another. In some embodiments, however, only certain data may be transmitted by access point 402, such as data required for authenticating wireless client device 408. For example, in some embodiments, prior to successful authentication, access point 402 may not transmit data or messages received by it over the network that are addressed to wireless client device other than data or messages used for the authentication process. As illustrated in FIG. 9, access point 402 may transmit an authentication query 945 for receipt by wireless client device 408. Following this, wireless client device 408 may transmit an authentication reply 950 for receipt by wireless access point 402. For example, authentication query 945 and authentication reply 950 may correspond to data messages exchanged between wireless client device 408 and wireless access point 402 during an IEEE 802.1X or IEEE 802.11i authentication process.

After successful authentication, data 960, including messages received over the network by access point 402 that are addressed to wireless client 408, may be exchanged between wireless client device 408 and access point 402. If authentication remains incomplete, such as upon a timer elapsing, the association table entry corresponding to wireless client device 408 may be deleted or removed from the association table, at 955.

Optionally, association query 930 is transmitted only when a number of entries in the association table is equal to or larger than a threshold value. For example, in some embodiments, if the number of entries is larger than a threshold value, the association query process is bypassed and the association table entry is maintained without requiring an association reply. Therefore, in some embodiments, access point 402 may determine a size of the association table and compare it to a threshold and transmit the association query when the size of the association table is equal to and/or larger than the threshold.

Optionally, association query 930 is transmitted only when the source MAC address included in authentication request 905 and association request 915 is identified as a random or locally administered MAC address. For example, in some embodiments, if the source MAC address included in authentication request 905 and association request 915 is identified as a HW MAC address, a designated MAC address, or a previously observed MAC address, the association query process is bypassed and the association table entry is maintained without requiring an association reply.

The process illustrated in FIG. 9 may optionally be combined with the assignment of designated MAC addresses described above and/or illustrated in FIGS. 6 and 7A and 7B.

Figure 10:
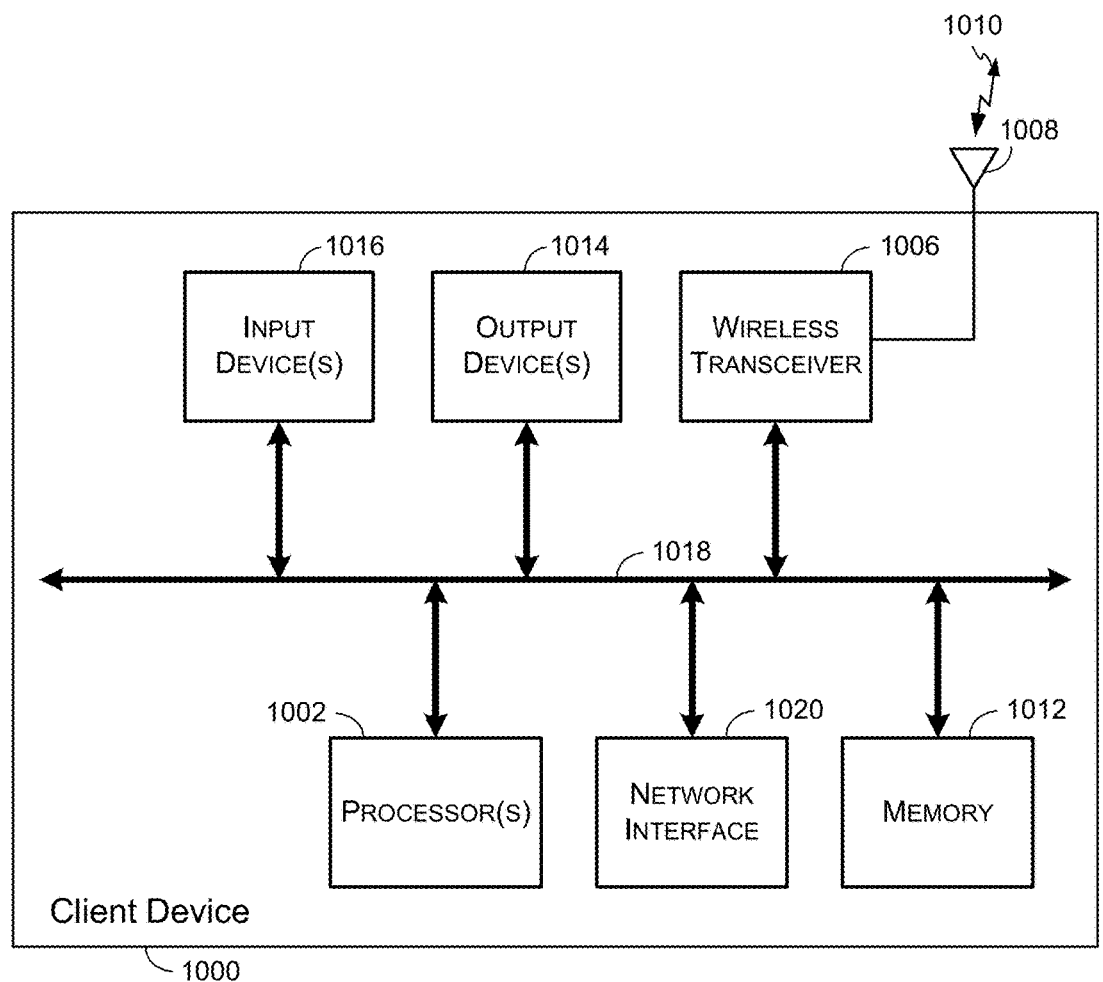
FIG. 10 is a block diagram illustrating an example of a wireless client device in accordance with some embodiments.

FIG. 10 illustrates an example of a client device 1000, such as a wireless client device that can connect to a wireless network, for example by association with an access point. Client devices may also be referred to herein as wireless devices, stations, and the like. The client device 1000 includes hardware elements that can be electrically coupled via a bus 1018 (or may otherwise be in communication, as appropriate). In one embodiment, the bus 1018 can be used for the processor(s) 1002 to communicate between cores and/or with the memory 1012. The hardware elements may include one or more processors 1002, including without limitation one or more general-purpose processors and/or one or more special-purpose processors (such as digital signal processing chips, graphics acceleration processors, and/or the like); one or more input devices 1016; one or more output devices 1014; and one or more wireless transceivers 1006. Optionally, input device 1016 can include numerous devices including, without limitation, a camera, a mouse, a keyboard, a touch sensitive screen, a touch pad, a keypad, and/or the like. Optionally, output device 1014 can include numerous devices including, but not limited to, a display, a printer and/or the like. Client devices optionally include one or more network interfaces 1020, such as for network communications over a wired medium, such as a twisted pair cable, a coaxial cable, a fiber optic cable or other network communication cable. For example, network interface 1020 may provide for a wired network connection to an IEEE 802.3 compliant Ethernet network.

The client device 1000 includes one or more wireless transceivers 1006 connected to the bus 1018. The wireless transceiver 1006 may be operable to transmit and/or receive wireless signals (e.g., signal 1010) via one or more antennas 1008. A wireless signal 1010 received by client device 1000 may be transmitted via a wireless device compliant with a wireless communications standard that the client device 1000 supports. A wireless signal 1010 transmitted by client device 1000 may be a wireless signal compliant with a wireless communications standard that the client device 1000 supports. For example, embodiments are contemplated where the wireless communications standard is one or more of IEEE 802.11, Bluetooth, Zigbee, UWB, wireless USB, Z-Wave and the like. In an exemplary embodiment, the wireless communications standard is an IEEE 802.11 standard, such as 802.11n or 802.11 ac. Wireless transceiver 1006 may be configured to transmit and/or receive various radio frequency (RF) signals (e.g., signal 1010) via antenna 1008 from one or gateways, network devices, access points, other client devices, cellular networks, and/or the like. Client device 1000 may also be configured to decode and/or decrypt various signals received.

The client device 1000 may further include (and/or be in communication with) one or more non-transitory machine-readable storage mediums or storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1012, such as RAM, ROM, FLASH, or disc drive, and executed by processor(s) 1002. The client device 1000 can also comprise software elements or functions (e.g., located within the memory 1012), including, for example, an operating system, device drivers, executable libraries, and/or other code, such as one or more application programs, which may comprise computer programs implementing various functions. Memory 1012 may be a non-transitory machine-readable storage medium, processor-readable memory, and/or a computer-readable memory that stores the one or more computer-program products configured to cause the processor(s) 1002 to perform various functions. In other embodiments, various functions described may be performed in hardware.

Figure 11:
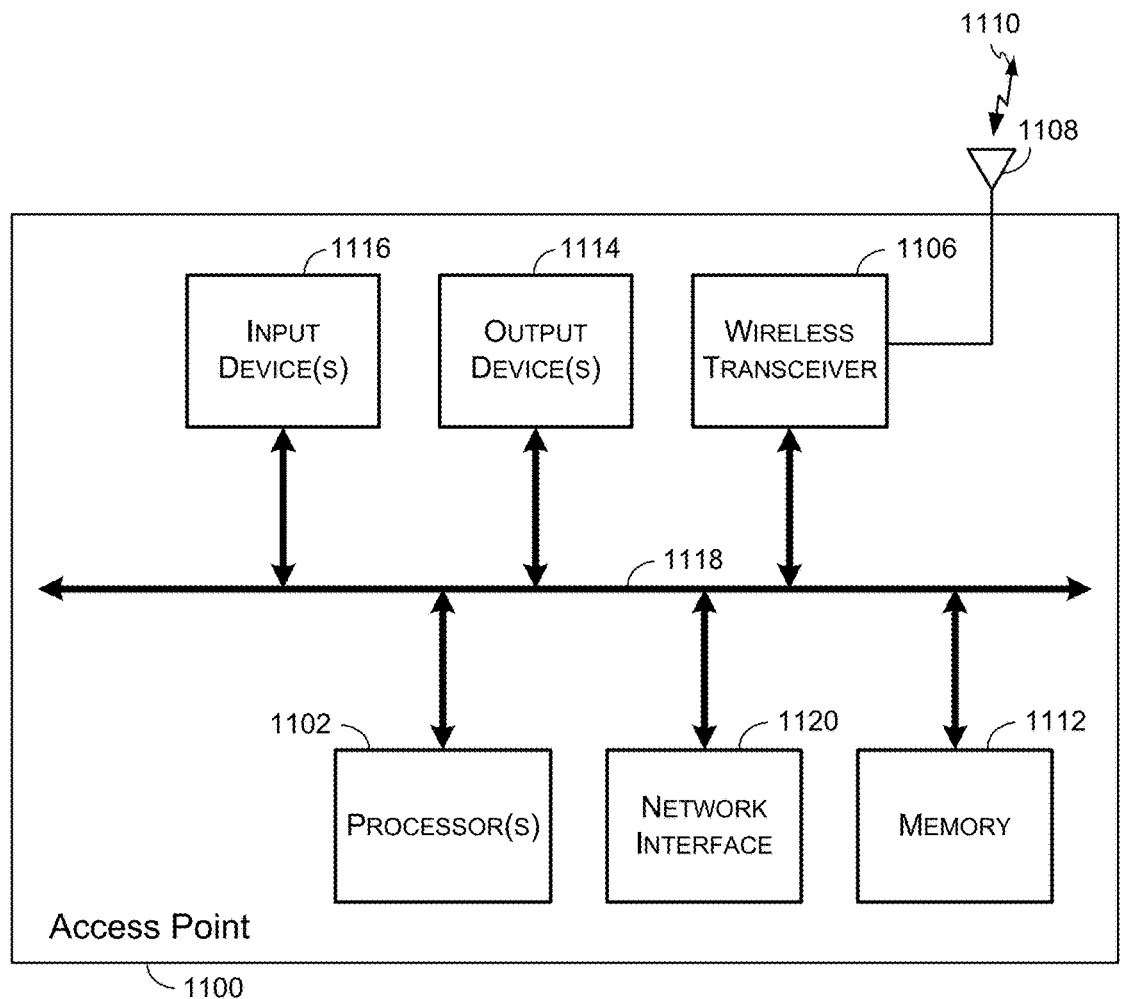
FIG. 11 is a block diagram illustrating an example of an access point in accordance with some embodiments.

FIG. 11 illustrates an example of an access point 1100. The access point 1100 may optionally include or otherwise function as a range extending device, a router, a gateway, a modem, and/or any other device that provides network access among one or more computing devices and/or networks. For example, access point 1100 may include a router gateway with access point and router functionality, and may further include an Ethernet switch and/or a modem. As another example, the access point 1100 may include a range extender that may be used to improve signal range and strength within a wireless network by taking an existing signal from another access point and rebroadcasting the signal to create an expanded logical network. Optionally, access point 1100 may include or otherwise function as a network controller for configuring and/or managing itself and/or other access points.

The access point 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation one or more buttons, a keyboard, a keypad, a touch sensitive screen, a touch pad, and/or the like; and one or more output devices 1114, which can include, without limitation, a display, light or sound indicators, and/or the like.

The access point 1100 may include one or more wireless transceivers 1106 connected to the bus 1118. The wireless transceiver 1106 may be operable to receive and transmit wireless signals (e.g., a wireless signal 1110) via an antenna 1108. The wireless transceiver 1106 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 1106 may include a 2.4 GHz WiFi circuit or a 5 GHz WiFi circuit. Accordingly, the access point 1100 may include a single WiFi circuit for a WiFi communications, and a single Bluetooth circuit for Bluetooth communications. In some embodiments, the access point 1100 may include multiple wireless transceivers (not shown) for each available communications standard. The antenna 1108 may include multiple band antennas that can transmit and/or receive signals over different frequency bands.

The access point 1100 may further include a radio frequency (RF) circuit. In some embodiments, the wireless transceiver 1106 may be integrated with or coupled to the RF circuit so that the RF circuit includes the wireless transceiver 1106. In some embodiments, the wireless transceiver 1106 and the RF circuit are separate components. The RF circuit may include a RF amplifier that may amplify signals received over antenna 1108. The RF circuit may also include a power controller that may be used to adjust signal amplification by the RF amplifier. The power controller may be implemented using hardware, firmware, software, or any combination thereof.

The wireless signal 1110 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 1106 may be configured to receive various radio frequency (RF) signals (e.g., signal 1110) via antenna 1108, respectively, from one or more other access points, network devices, beacons and/or the like. Access point 1100 may also be configured to decode and/or decrypt various signals received from one or more access points, network devices, wireless client devices, and/or the like.

The access point 1100 may include a power supply (not shown) that can power the various components. The power supply may include a switched-mode power supply, a linear power supply, a push-pull power supply, or any other suitable type of power supply. In some embodiments, the access point 1100 may include multiple power supplies. For example, a switched-mode power supply may be used to condition input power, and a linear power supply may be used to power the RF circuit. The power supply may be configured to operate over various ranges of appropriate input voltages.

Alternatively, the access point 1100 may include circuitry for receiving voltage, current or power via an external power supply or a Power over Ethernet connection. Power over Ethernet support is optionally provided by network interface 1120. Network interface 1120 can provide for network connections to external devices via any standardized or specialized network connection, such as IEEE 802.3. In an exemplary embodiment, network interface 1120 provides support for a wired Ethernet connection to a network. Other wired network technologies are contemplated for connection to networks, as will be understood by the skilled artisan; however, due to its ubiquitous nature and support for Power over Ethernet, wired Ethernet over twisted pairs may be preferentially employed.

The access point 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102. The access point 1100 can also comprise software elements (e.g., located within the memory 1112), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 12:
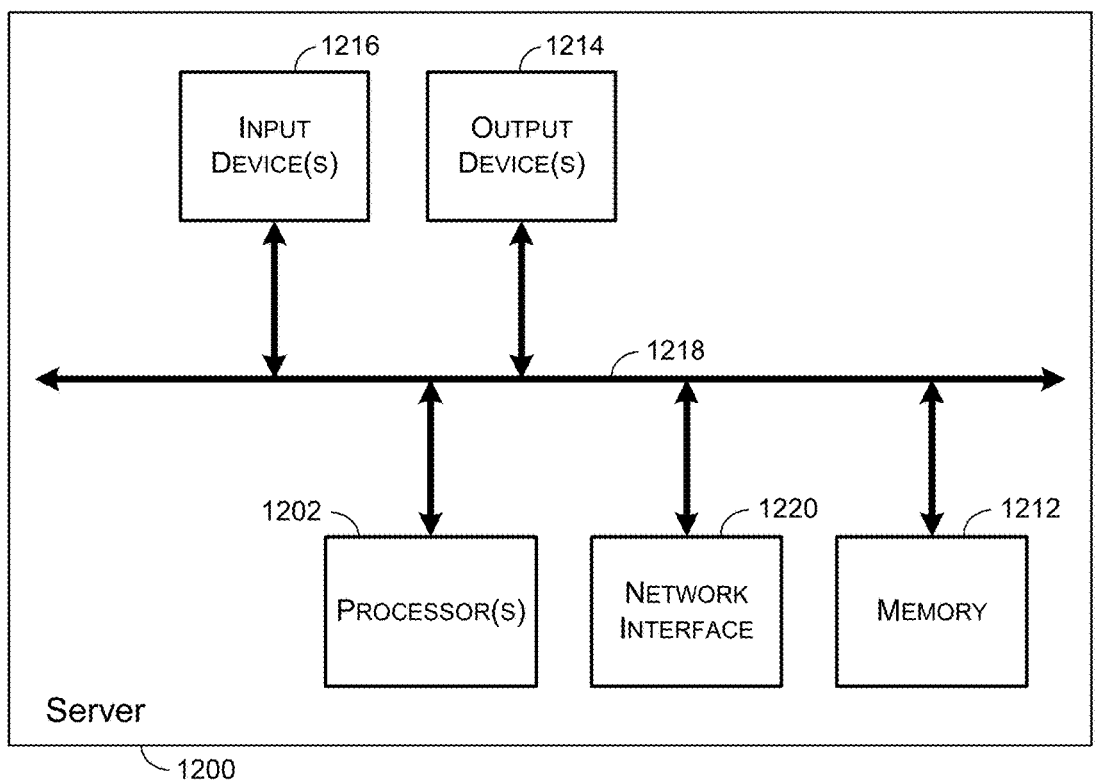
FIG. 12 is a block diagram illustrating an example of a server in accordance with some embodiments.

FIG. 12 illustrates an example of a server 1200. In various embodiments, server 1200 may communicate with other devices such as using one or more wireless or wired data networks. Server 1200 may provide network services and/or may be used to control and/or manage one or more wireless devices, such as one or more wireless access points. The server 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like), memory 1212, output devices 1214, input devices 1216, a bus 1218 and a network interface 1220. Furthermore, in addition to the network interface 1220, server 1200 can optionally further include a wireless transceiver to communicate with a network (e.g., a wireless local area network, a wireless network of a preferred carrier, Internet, etc.).

The server 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1212. The server 1200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 1212 may be a non-transitory machine-readable storage medium, processor-readable memory, and/or a computer-readable memory that stores the one or more computer-program products configured to cause the processor(s) 1202 to perform the functions described. In other embodiments, one or more of the functions described may be performed in hardware.

A set of these instructions and/or code is optionally stored on a non-transitory machine-readable storage medium, such as the memory 1212. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1200 and/or may take the form of source and/or installable code, which, upon compilation and/or installation on the server 1200 (e.g., using any of a variety of generally available compilers, installation programs, compression/decompression utilities, etc.) then takes the form of executable code.

Merely by way of example, one or more procedures described with respect to the processes or methods discussed above, for example as described with respect to FIG. 5-9 or any portion thereof, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIGS. 5-9 and portions thereof. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware. Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system comprising:
one or more processors; and
a non-transitory computer readable storage medium coupled to the one or more processors, wherein the non-transitory computer readable storage medium includes instructions that, when executed by the one or more processors, cause the one or more processors to perform operations including:
transmitting, by a wireless client device, a request for a media access control (MAC) address;
receiving a response to the request, wherein the response is related to a network device, and wherein the response includes a designated MAC address;
transmitting an association request, wherein the association request includes the designated MAC address; and
receiving an association response, wherein the association response is related to the network device, and wherein the association response includes an association identifier,
wherein receiving the association request at the network device causes the network device to update an association table with an entry for the wireless client device, and wherein the entry includes the designated MAC address.

2. The system of claim 1, wherein the request includes a Class 1 management frame, an action frame, an authentication frame, or a probe request frame.

3. The system of claim 1, wherein the response includes a Class 1 management frame, an action frame, an authentication frame, or a probe response frame.

4. The system of claim 1, wherein receiving the request at the network device causes the network device to identify the designated MAC address.

5. The system of claim 1, wherein the request for a MAC address includes an identifier corresponding to the network device.

6. The system of claim 1, wherein receiving the association request at the network device causes the network device to confirm that the designated MAC address included in the association request is authorized for use by the wireless client device.

7. The system of claim 1, wherein the operations further include:
receiving an indicator of an availability of designated MAC addresses.

8. The system of claim 7, wherein receiving the indicator includes receiving a beacon frame or a probe response frame, and wherein the beacon frame or probe response frame includes the indicator.

9. The system of claim 8, wherein a service set identifier (SSID) of the beacon frame or probe response frame includes the indicator.

10. The system of claim 8, wherein a vendor specific element of the beacon frame or probe response frame includes the indicator.

11. The system of claim 1, wherein the operations further include:
receiving an association query, wherein the association query includes the designated MAC address; and
transmitting a response to the association query.

12. The system of claim 1, wherein the operations further include:
transmitting an authentication query, wherein receiving the authentication at the wireless client device causes the wireless client device to transmit a response to the authentication query;
monitoring for an authentication response to the authentication query for a predetermined time period;
determining that an authentication response is not received during the predetermined time period; and
updating the association table to remove the entry for the wireless client device.

13. The system of claim 12, wherein receiving the response to the authentication query at the network device causes the network device to update an association table with an entry for the wireless client device, and wherein the entry includes the designated MAC address.

14. The system of claim 12, wherein the authentication query and the response to the authentication query include elements of wireless authentication process.

15. The system of claim 1, wherein the network device is a wireless access point compliant.

16. The system of claim 1, wherein the network device is a network controller.

17. A computer implemented method, comprising:
transmitting, by a wireless client device, a request for a media access control (MAC) address;
receiving a response to the request, wherein the response is related to a network device, and wherein the response includes a designated MAC address;
transmitting an association request, wherein the association request includes the designated MAC address; and
receiving an association response, wherein the association response is related to the network device, and wherein the association response includes an association identifier,
wherein receiving the association request causes the network device to update an association table with an entry for the wireless client device, and wherein the entry includes the designated MAC address.

18. The method of claim 17, wherein the request includes a Class 1 management frame, an action frame, an authentication frame, or a probe request frame.

19. A non-transitory computer readable medium comprising instructions that, when executed by one or more processors, cause the one or more processors to perform operations including:
transmitting, by a wireless client device, a request for a media access control (MAC) address;
receiving a response to the request, wherein the response is related to a network device, and wherein the response includes a designated MAC address;
transmitting an association request, wherein the association request includes the designated MAC address; and
receiving an association response, wherein the association response is related to the network device, and wherein the association response includes an association identifier,
wherein receiving the association request causes the network device to update an association table with an entry for the wireless client device, and wherein the entry includes the designated MAC address.

* * * * *